(12) United States Patent
Saeki

(10) Patent No.: US 11,115,245 B2
(45) Date of Patent: Sep. 7, 2021

(54) TRANSMISSION DEVICE AND COMMUNICATION SYSTEM

(71) Applicant: Sony Corporation, Tokyo (JP)

(72) Inventor: Takanori Saeki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/857,522

(22) Filed: Apr. 24, 2020

(65) Prior Publication Data

US 2020/0252242 A1    Aug. 6, 2020

Related U.S. Application Data

(63) Continuation of application No. 16/209,493, filed on Dec. 4, 2018, now Pat. No. 10,644,905, which is a
(Continued)

(30) Foreign Application Priority Data

Mar. 25, 2014  (JP) .................................. 2014-062571

(51) Int. Cl.
*H04B 3/00* (2006.01)
*H04L 25/00* (2006.01)
(Continued)

(52) U.S. Cl.
CPC .......... *H04L 25/0278* (2013.01); *H03M 9/00* (2013.01); *H04L 25/028* (2013.01); *H04L 25/0272* (2013.01)

(58) Field of Classification Search
CPC ............... H04L 25/0278; H04L 25/028; H04L 25/0272; H03M 9/00; H04B 3/06; H03K 19/018585; G01S 1/00
(Continued)

(56) References Cited

U.S. PATENT DOCUMENTS

| 5,721,504 A | 2/1998 | Fumiko |
| 8,482,502 B2 | 7/2013 | Woo et al. |

(Continued)

FOREIGN PATENT DOCUMENTS

| EP | 2056547 A2 | 5/2009 |
| JP | 2000353035 A | 12/2000 |

(Continued)

OTHER PUBLICATIONS

Extended European Search Report dated Jun. 25, 2020 for corresponding European Application No. 2160132_5.
(Continued)

*Primary Examiner* — Phuong Phu

(74) *Attorney, Agent, or Firm* — Michael Best & Friedrich LLP

(57) ABSTRACT

A transmission device of the disclosure includes a first selector configured to select one of a first signal and a second signal, and output the selected signal; a second selector configured to select one of an inversion signal of the first signal, the second signal, and an inversion signal of the second signal, and output the selected signal; a first control signal generator configured to generate a first control signal, a second control signal, and a third control signal, based on the first signal, the second signal, and a third signal; a first driver configured to set a voltage of a first output terminal, based on an output signal of the first selector and the first control signal; and a second driver configured to set a voltage of a second output terminal, based on an output signal of the second selector and the second control signal.

43 Claims, 23 Drawing Sheets

Related U.S. Application Data continuation of application No. 15/440,937, filed on Feb. 23, 2017, now Pat. No. 10,187,227, which is a continuation of application No. 15/057,422, filed on Mar. 1, 2016, now Pat. No. 9,621,380, which is a continuation of application No. PCT/JP2015/056304, filed on Mar. 4, 2015.

(51) Int. Cl.
  *H04L 25/02* (2006.01)
  *H03M 9/00* (2006.01)

(58) Field of Classification Search
  USPC .......... 375/257, 258, 219, 220, 222; 326/30
  See application file for complete search history.

(56) References Cited

U.S. PATENT DOCUMENTS

| | | | |
|---|---|---|---|
| 9,621,380 | B2 | 4/2017 | Saeki |
| 10,187,227 | B2 | 1/2019 | Saeki |
| 2005/0249295 | A1* | 11/2005 | Payne ............... G01S 1/00 375/257 |
| 2009/0225873 | A1 | 9/2009 | Lee et al. |
| 2010/0164539 | A1* | 7/2010 | Balamurugan ............... H03K 19/018585 326/30 |
| 2012/0039404 | A1 | 2/2012 | Chung et al. |
| 2012/0307931 | A1 | 12/2012 | Johnson |
| 2013/0051162 | A1 | 2/2013 | Amirkhany et al. |
| 2014/0003543 | A1 | 1/2014 | Wiley et al. |
| 2014/0230015 | A1 | 8/2014 | Pollock |
| 2014/0254712 | A1* | 9/2014 | Lee ............... H04B 3/06 375/295 |

FOREIGN PATENT DOCUMENTS

| | | |
|---|---|---|
| JP | 2009111794 A | 5/2009 |
| JP | 2010520715 A | 6/2010 |
| JP | 2011517159 A | 5/2011 |
| JP | 2016510187 A | 4/2016 |
| KR | 19960039604 A | 11/1996 |
| WO | 2015/146510 A1 | 10/2015 |

OTHER PUBLICATIONS

Extended European Search Report dated Sep. 22, 2017 for corresponding European Application No. 1569315.1.
Chinese Office Action dated Jan. 3, 2019 for corresponding Chinese Application No. 201580014385.X.
Japanese Office Action dated Nov. 12, 2019 for corresponding Japanese Application No. 2018-229990.
Taiwanese Office Action dated Aug. 26, 2020 for corresponding Taiwanese Application No. 104105929.
Korean Notice of Allowance dated Feb. 15, 2021 for corresponding Korean Application No. 10-2016-7024884.
Korean Notice of Allowance dated Jun. 24, 2021 for corresponding Korean Application No. 10-2021-7014400.

* cited by examiner

[ FIG. 1 ]
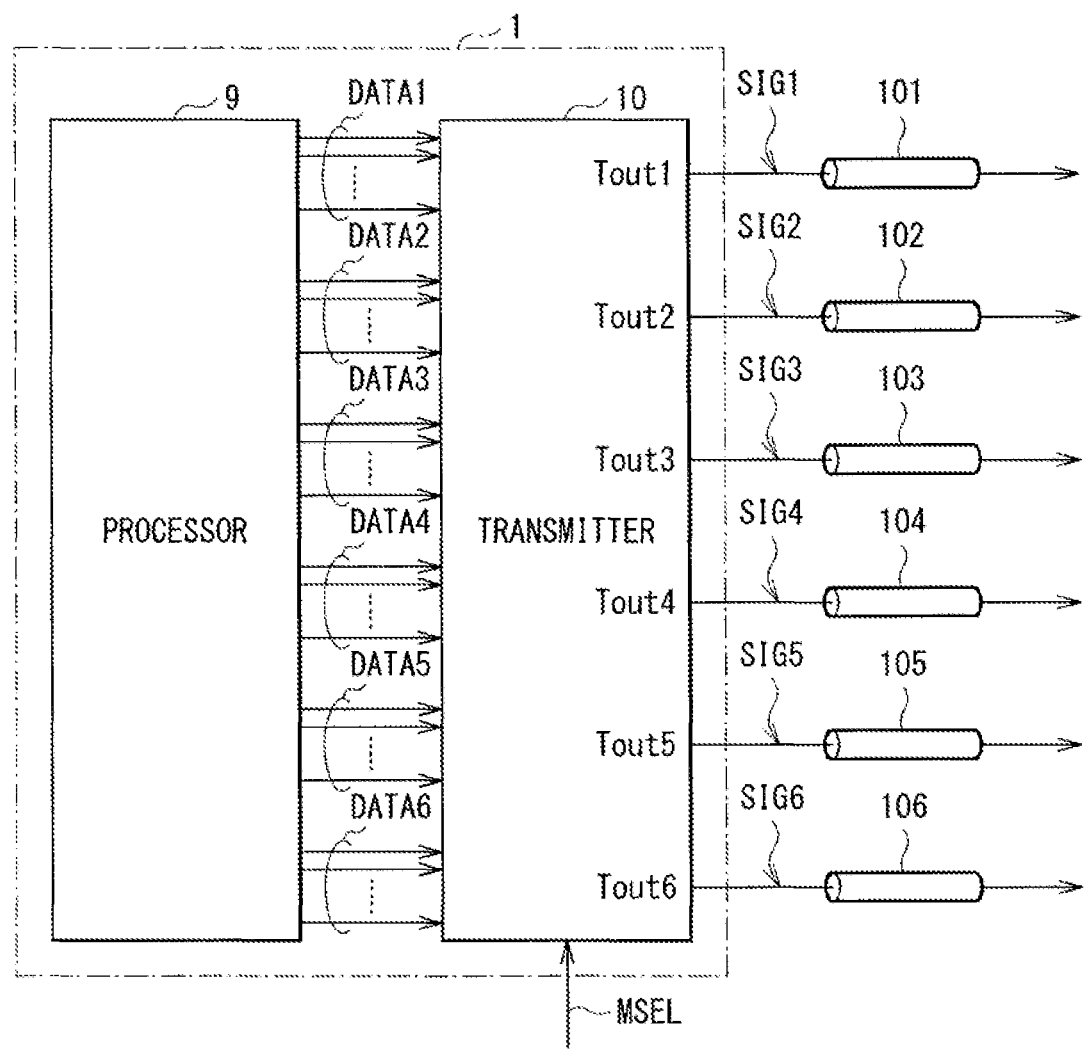

[FIG. 2]
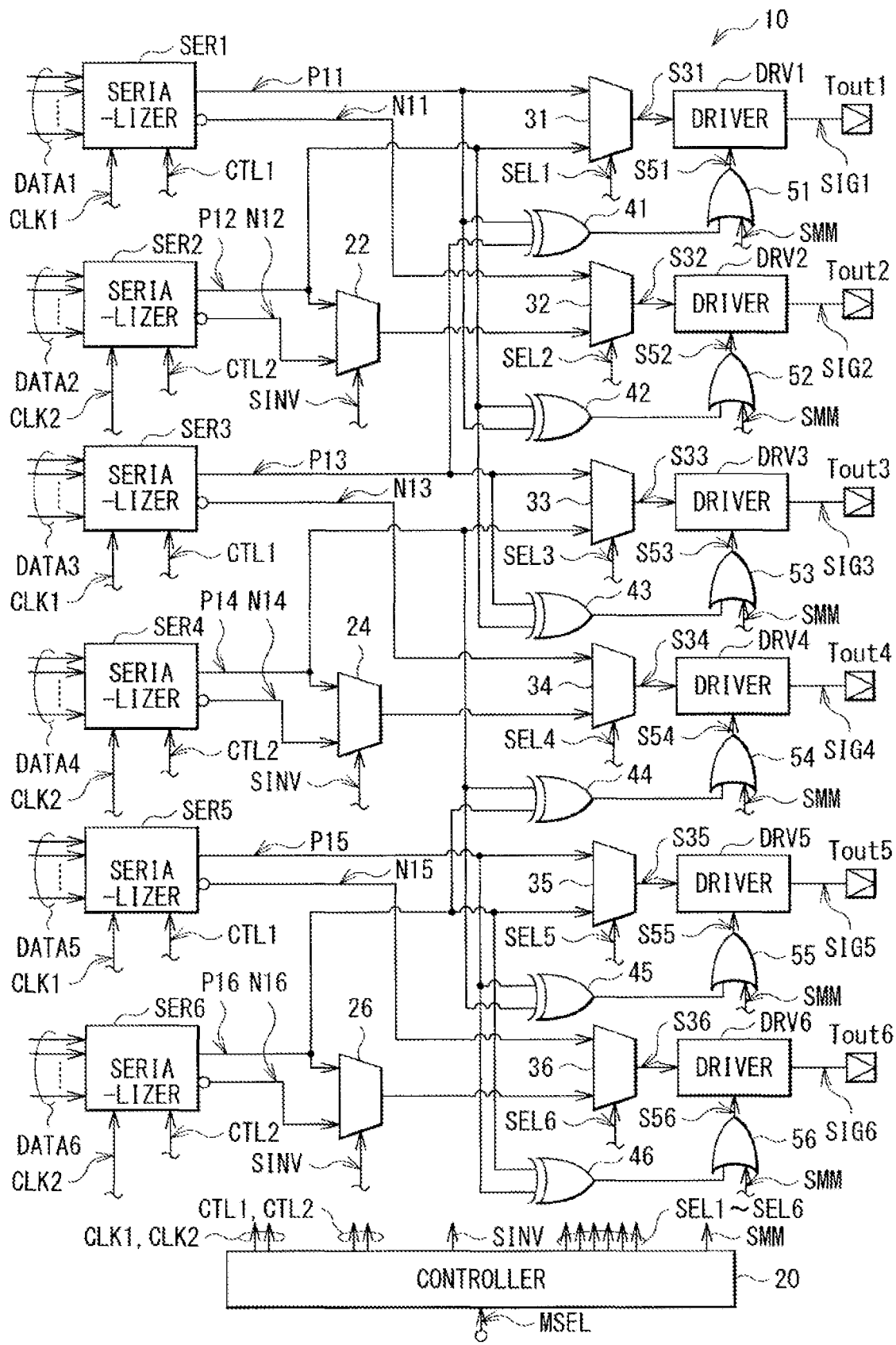

[FIG. 3]
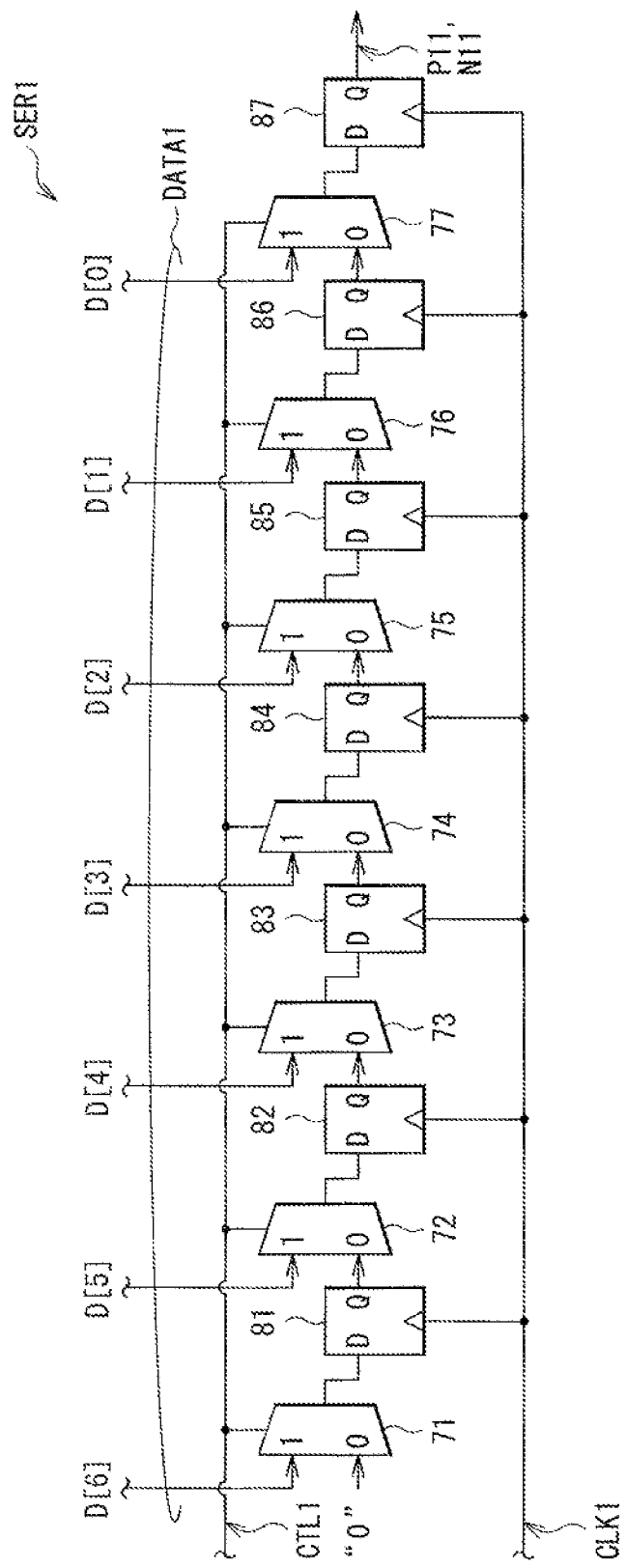

[FIG. 4]
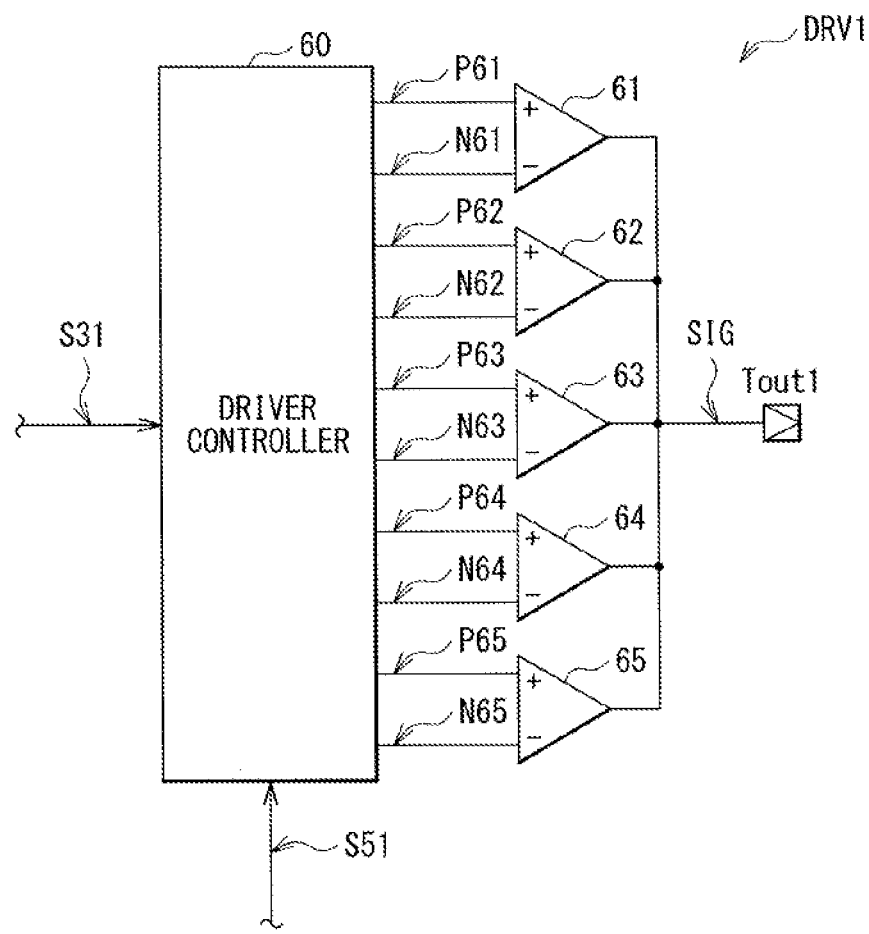
[FIG. 5]
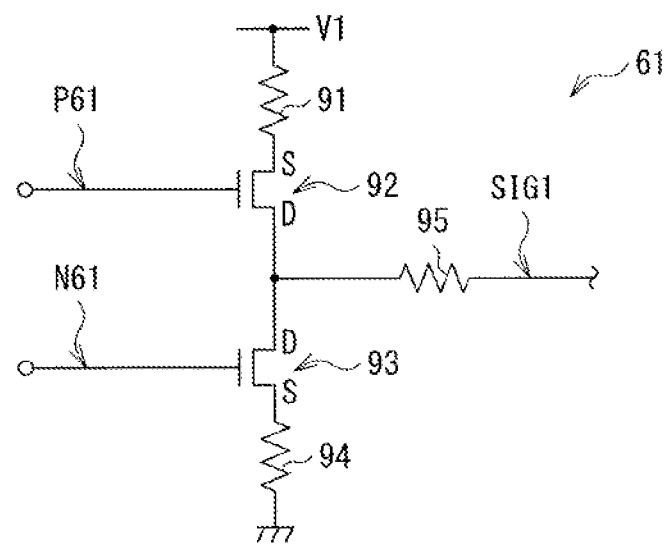

[ FIG. 6 ]
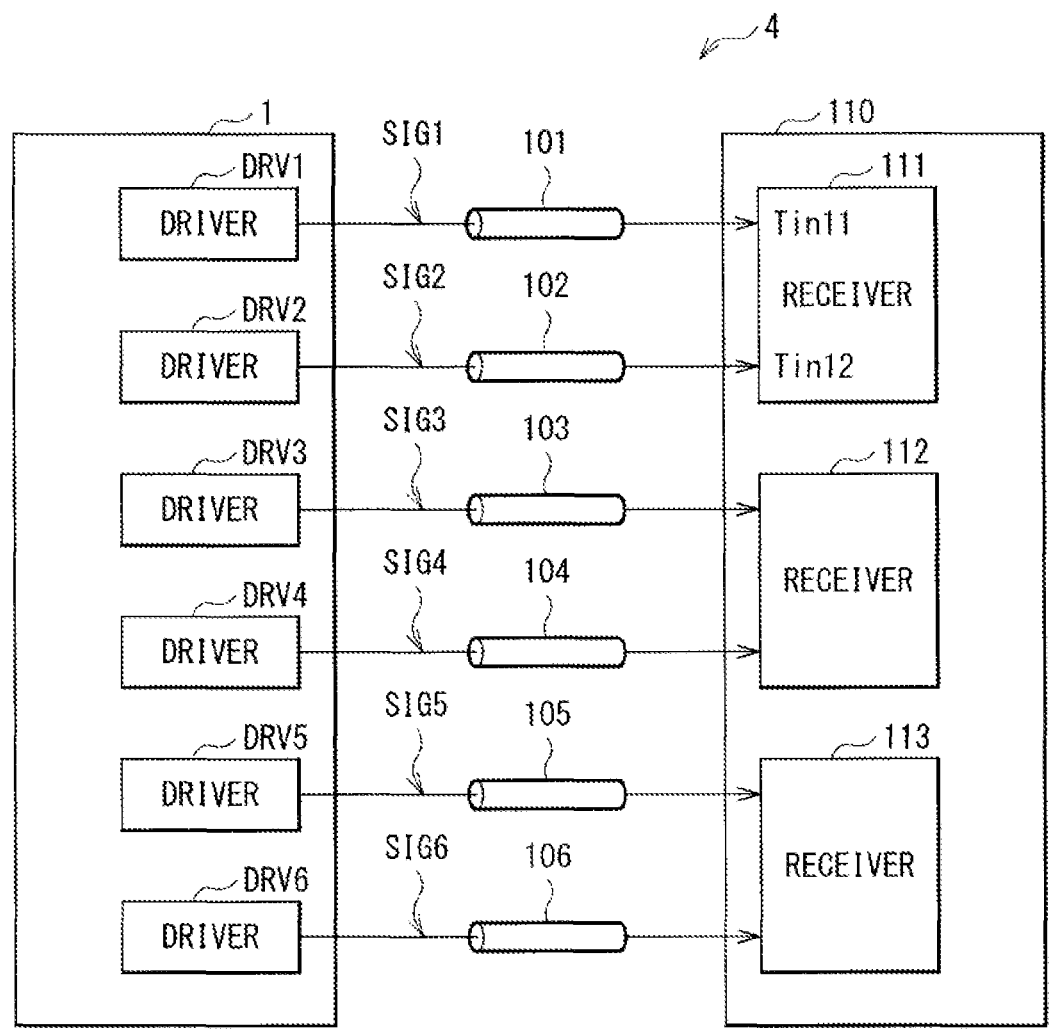
[ FIG. 7 ]
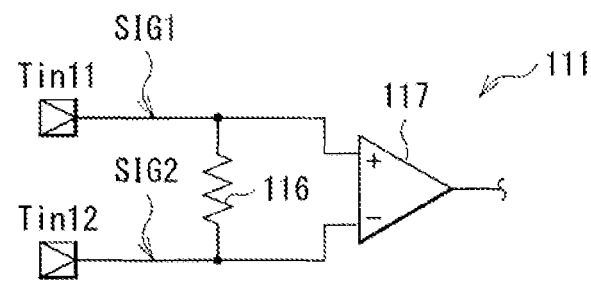

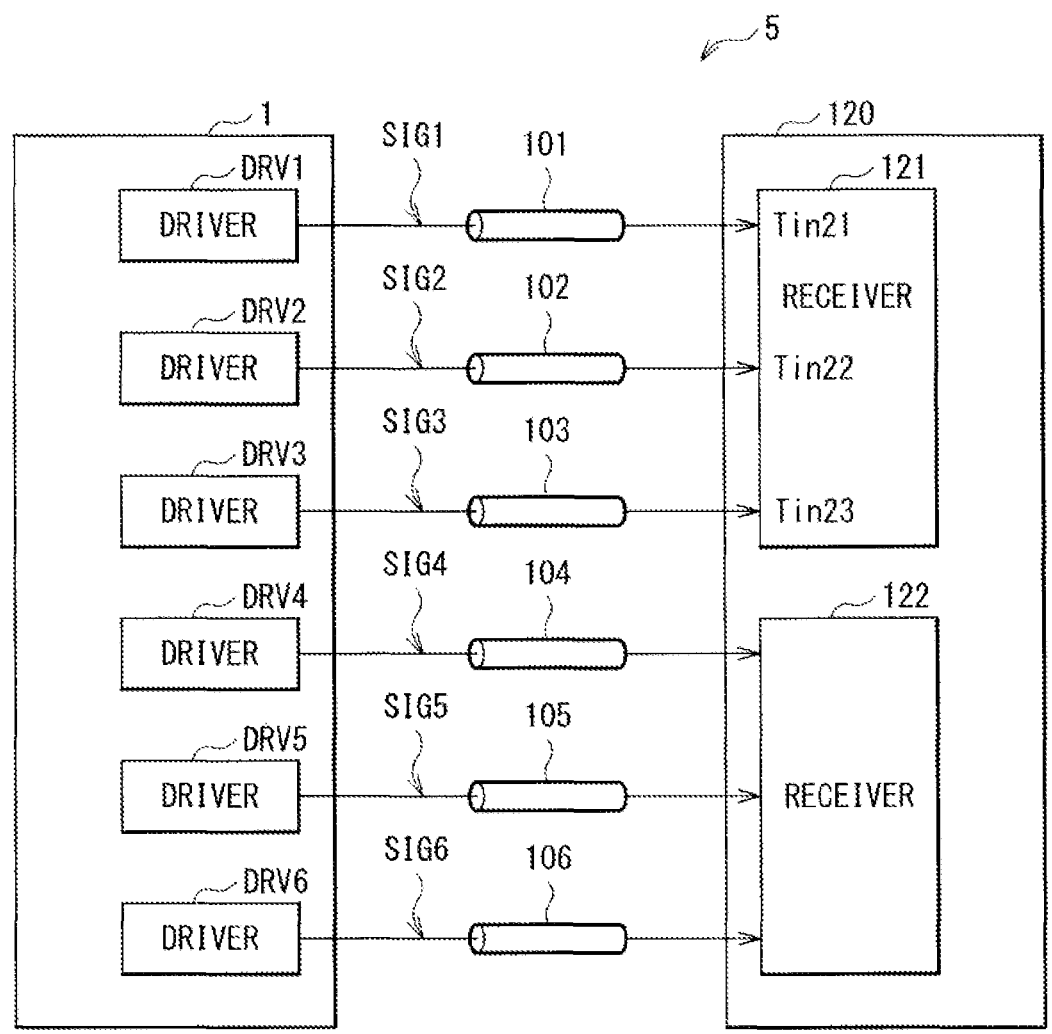
[FIG. 8]

[ FIG. 9 ]
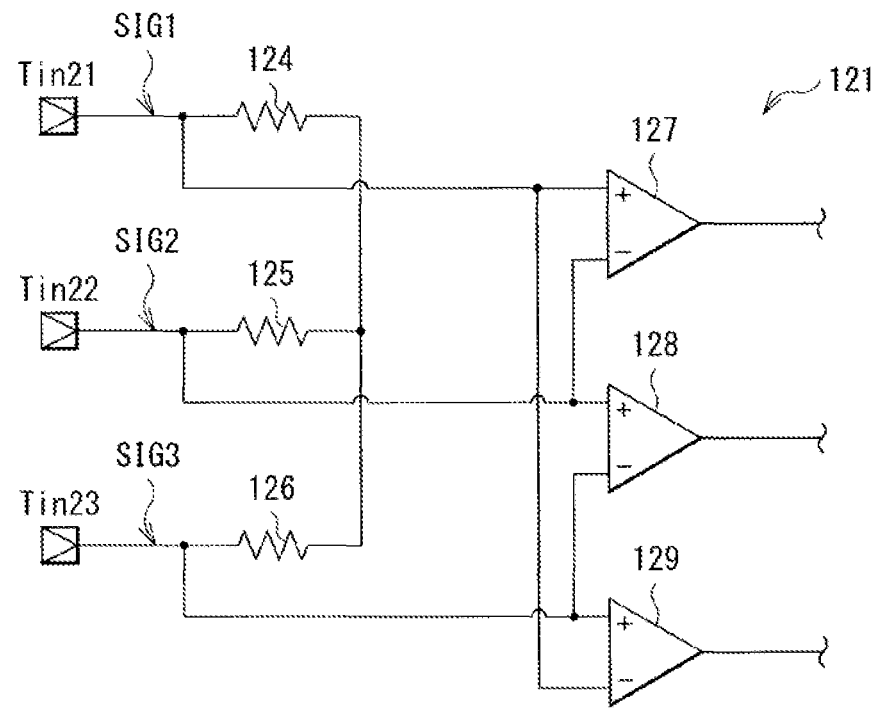
[ FIG. 10 ]
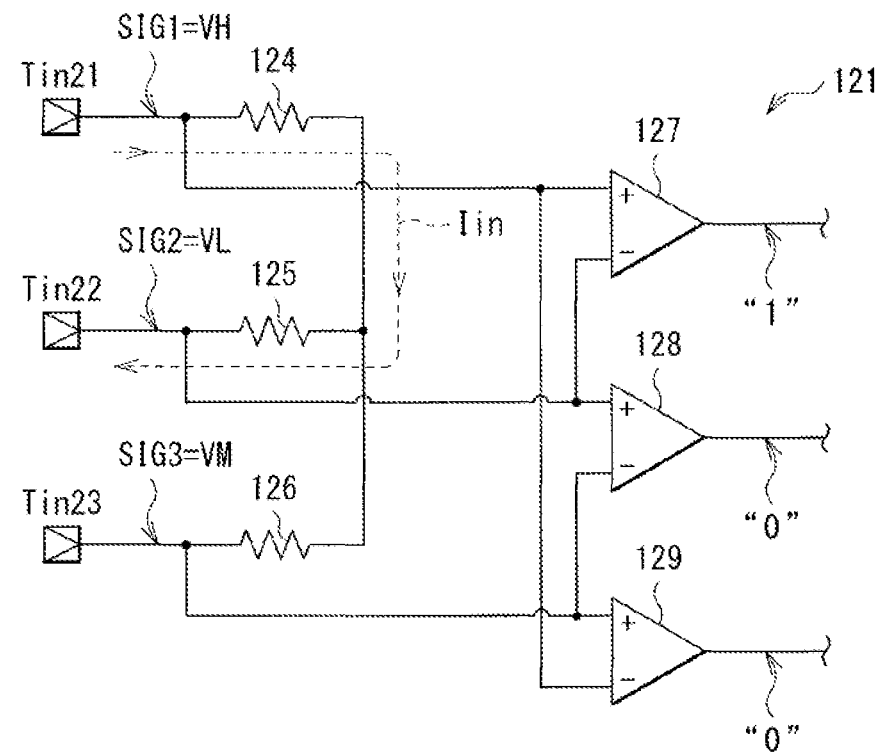

[ FIG. 11 ]
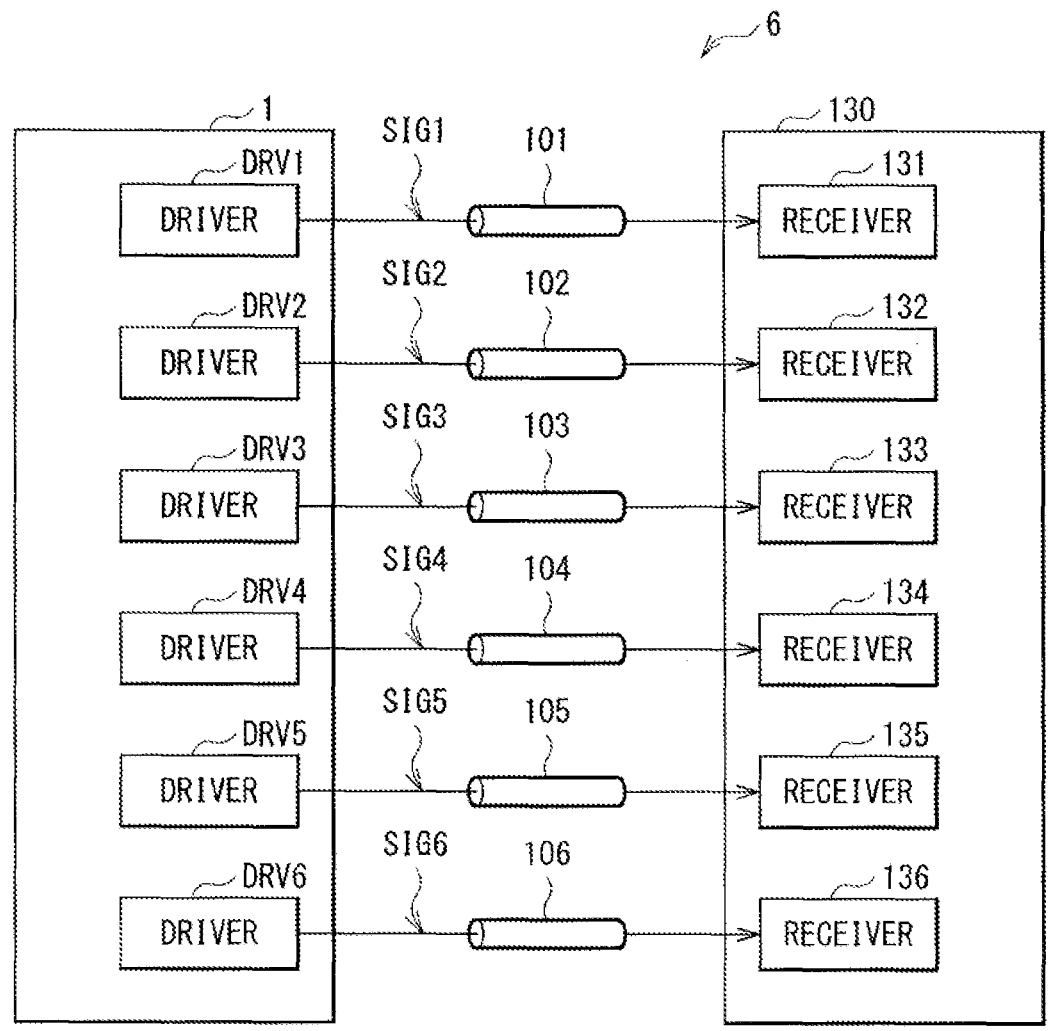
[ FIG. 12 ]
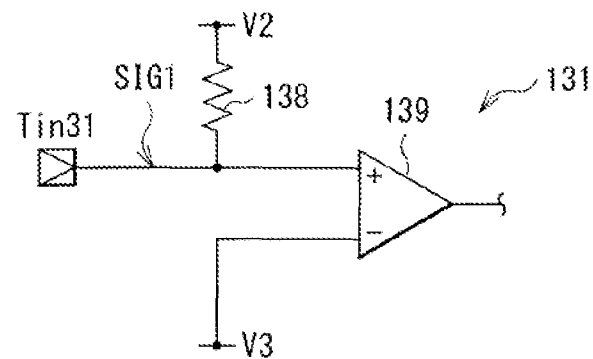

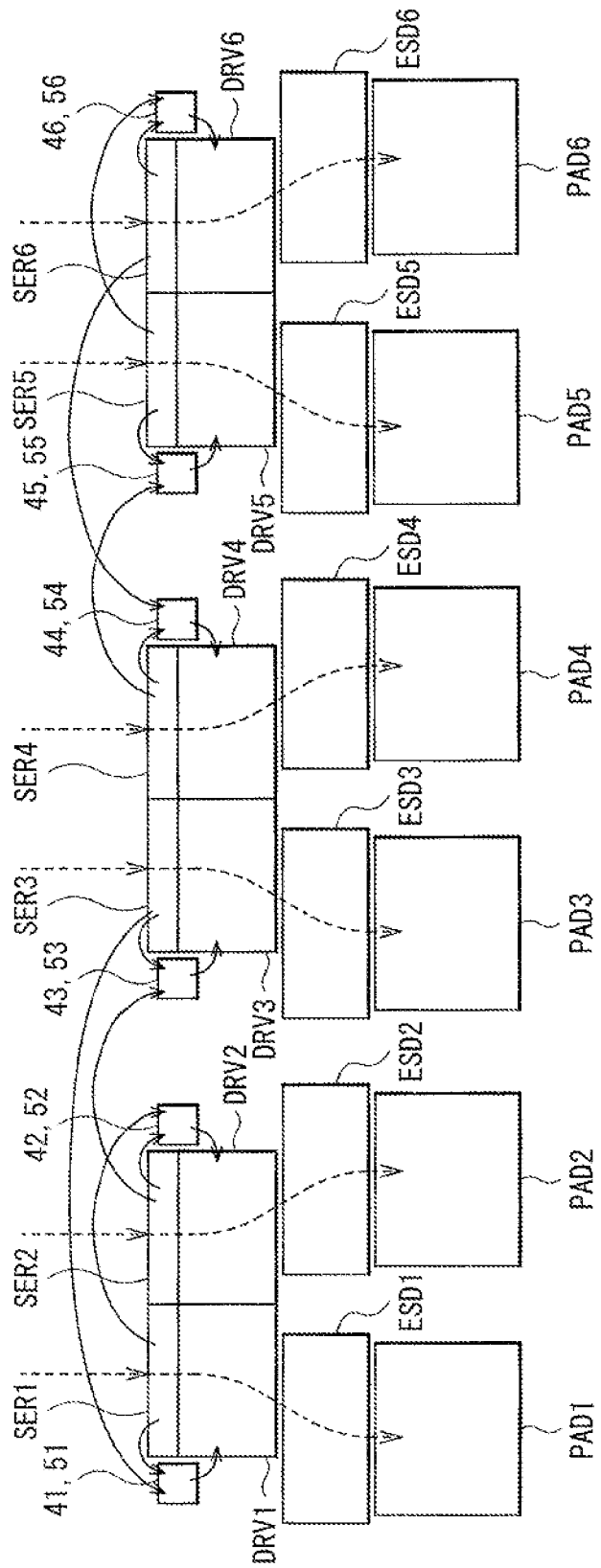
[ FIG. 13 ]

[ FIG. 14A ]
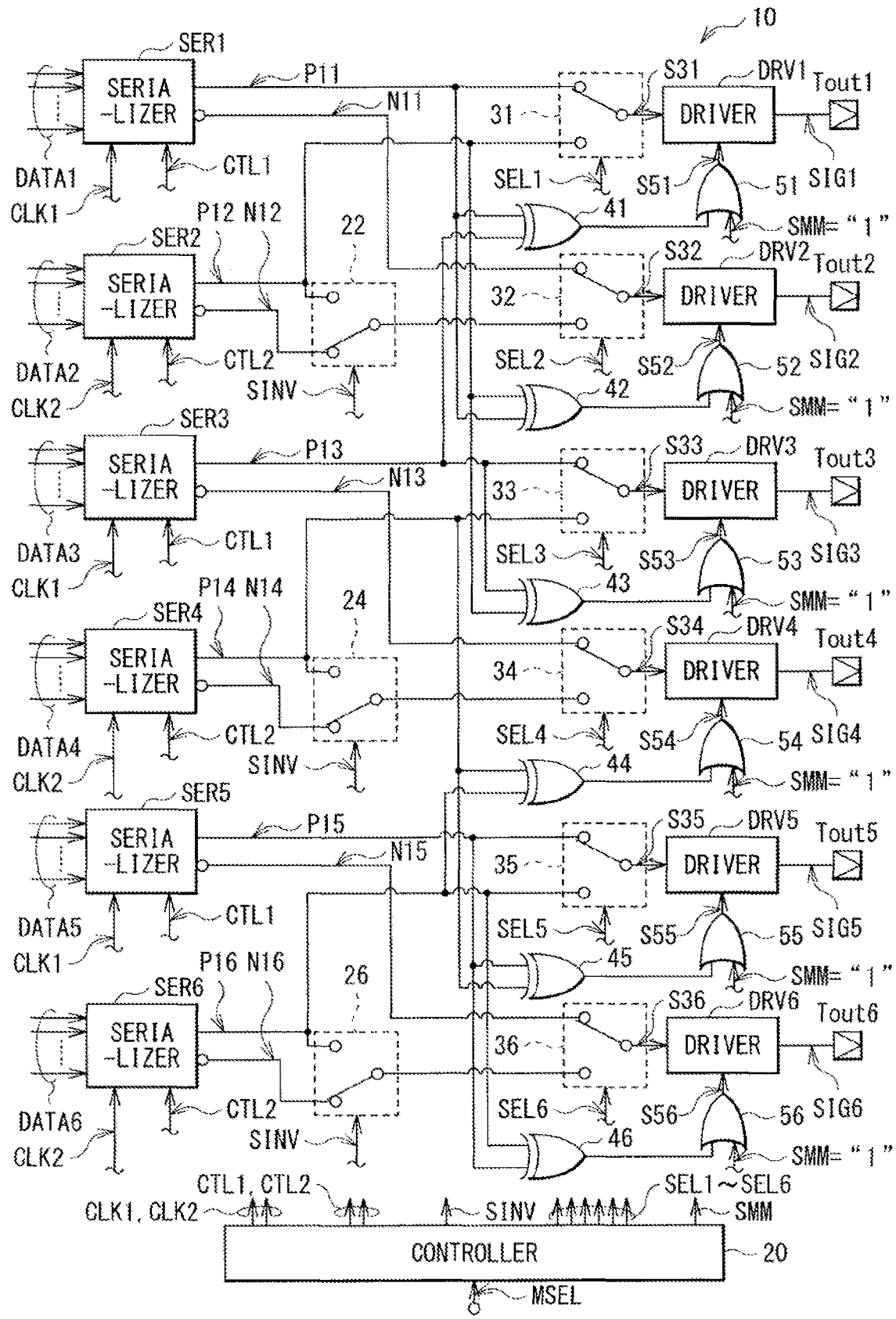

[ FIG. 14B ]
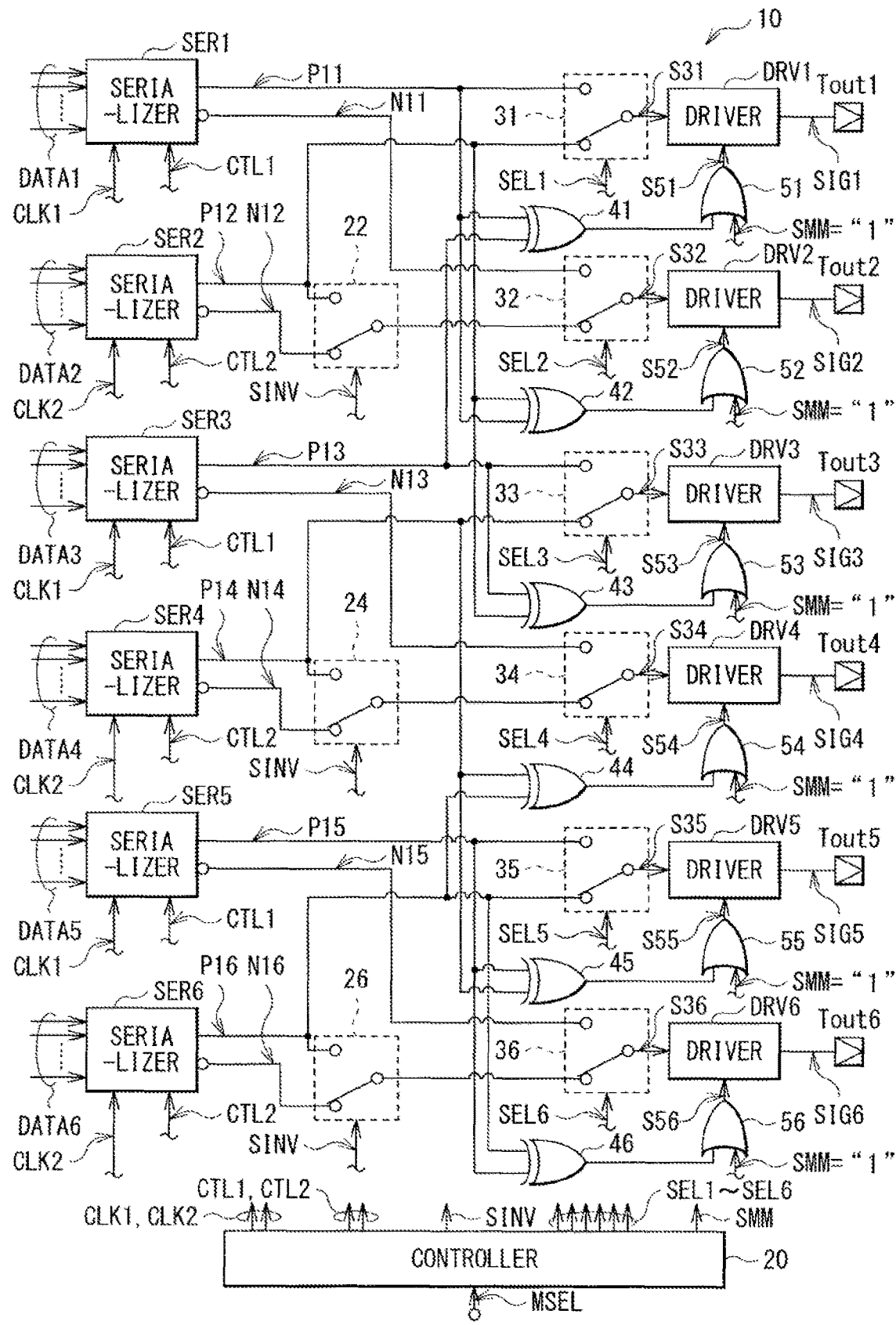

[ FIG. 15 ]

(A) SIGNAL P11 (SIGNAL N11)

(B) SIGNAL P12 (SIGNAL N12)

(C) SIGNAL S31 (SIGNAL S32)

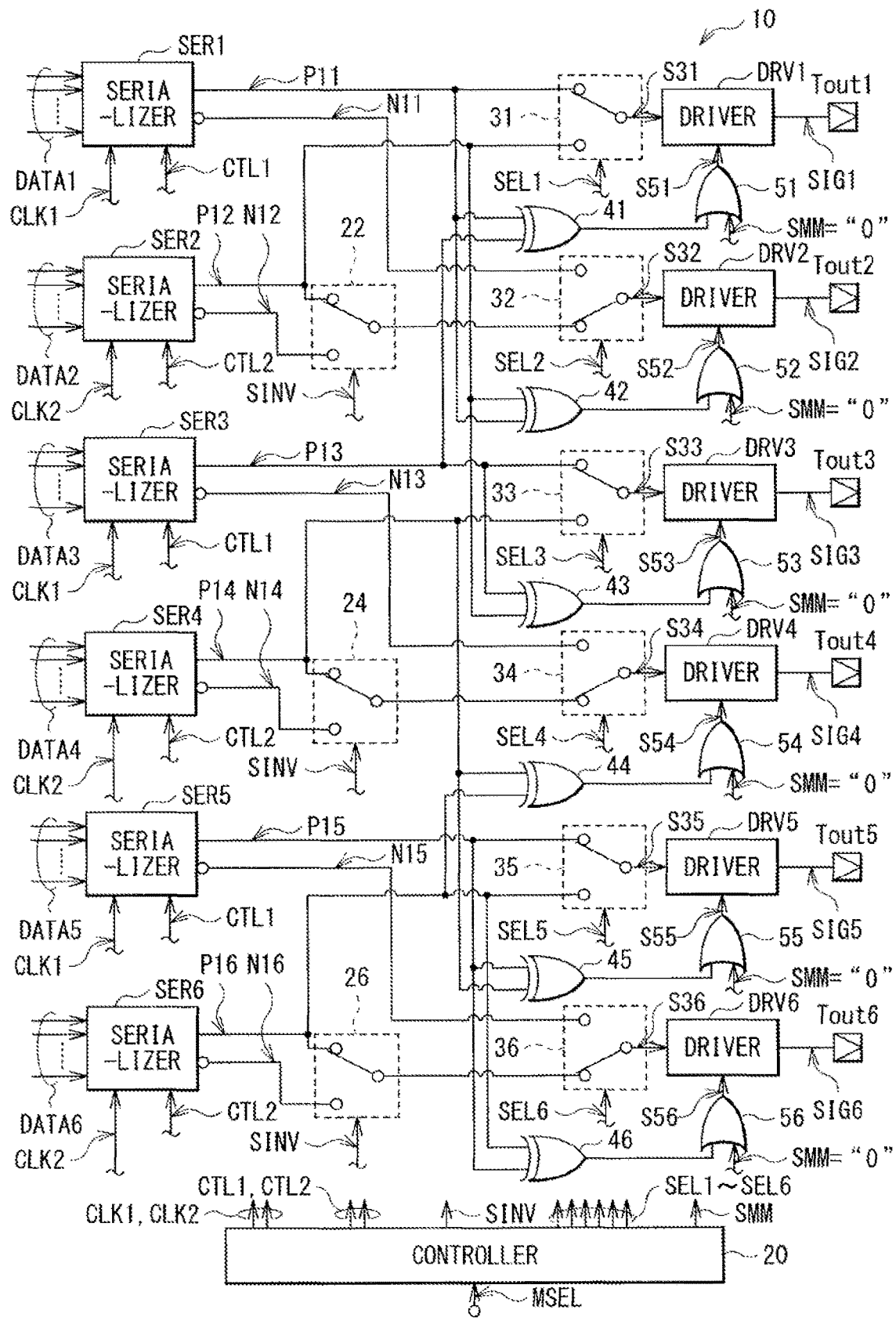
[ FIG. 16 ]

[ FIG. 17 ]

| SIGNAL P11 | SIGNAL P12 | SIGNAL P13 | SIGNAL S51 | SIGNAL S52 | SIGNAL S53 | SIGNAL SIG1 | SIGNAL SIG2 | SIGNAL SIG3 |
|---|---|---|---|---|---|---|---|---|
| 1 | 0 | 0 | 1 | 1 | 0 | VH | VL | VM |
| 0 | 1 | 1 | 1 | 1 | 0 | VL | VH | VM |
| 0 | 1 | 0 | 0 | 1 | 1 | VM | VH | VL |
| 1 | 0 | 1 | 0 | 1 | 1 | VM | VL | VH |
| 0 | 0 | 1 | 1 | 0 | 1 | VL | VM | VH |
| 1 | 1 | 0 | 1 | 0 | 1 | VH | VM | VL |

[ FIG. 18 ]
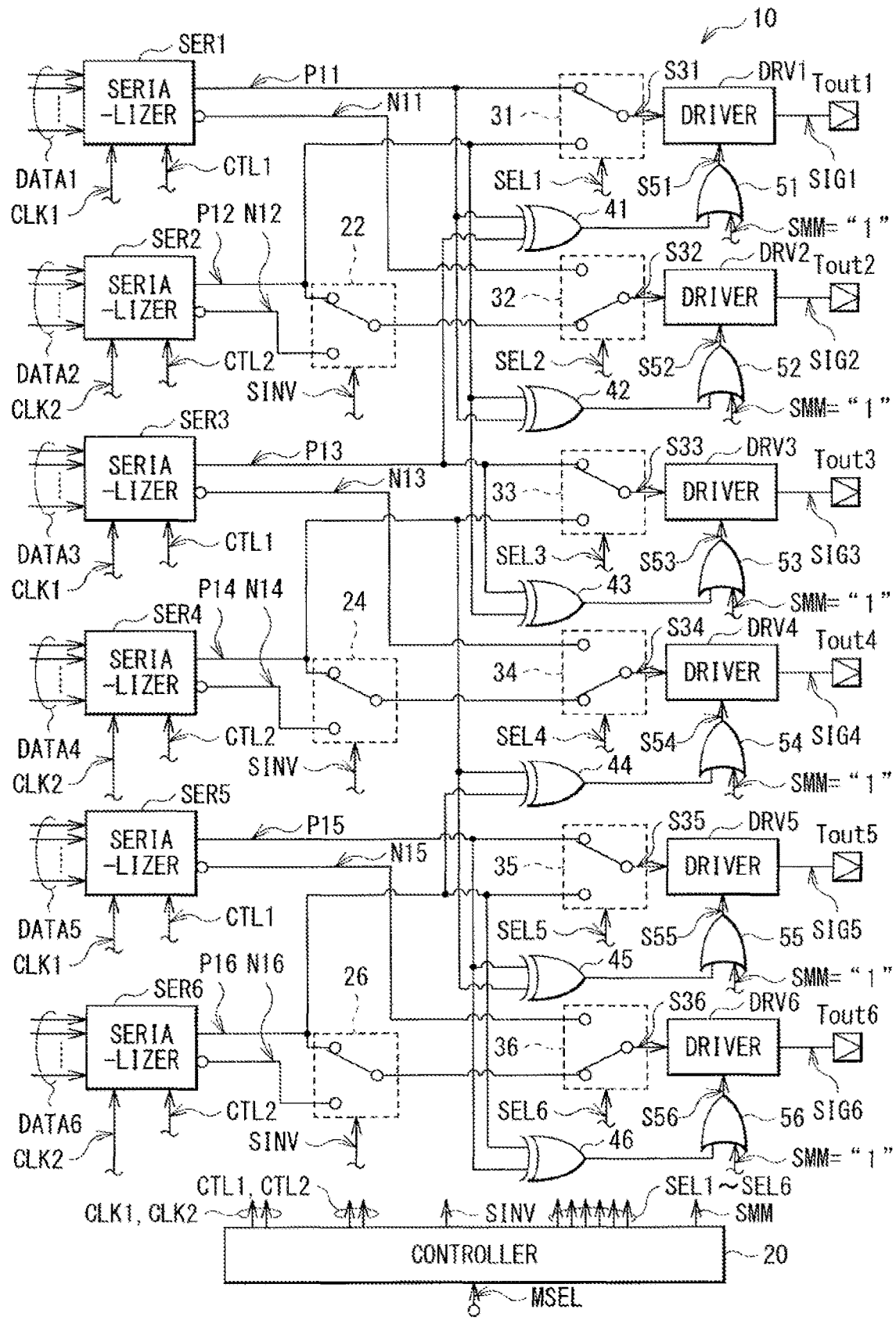

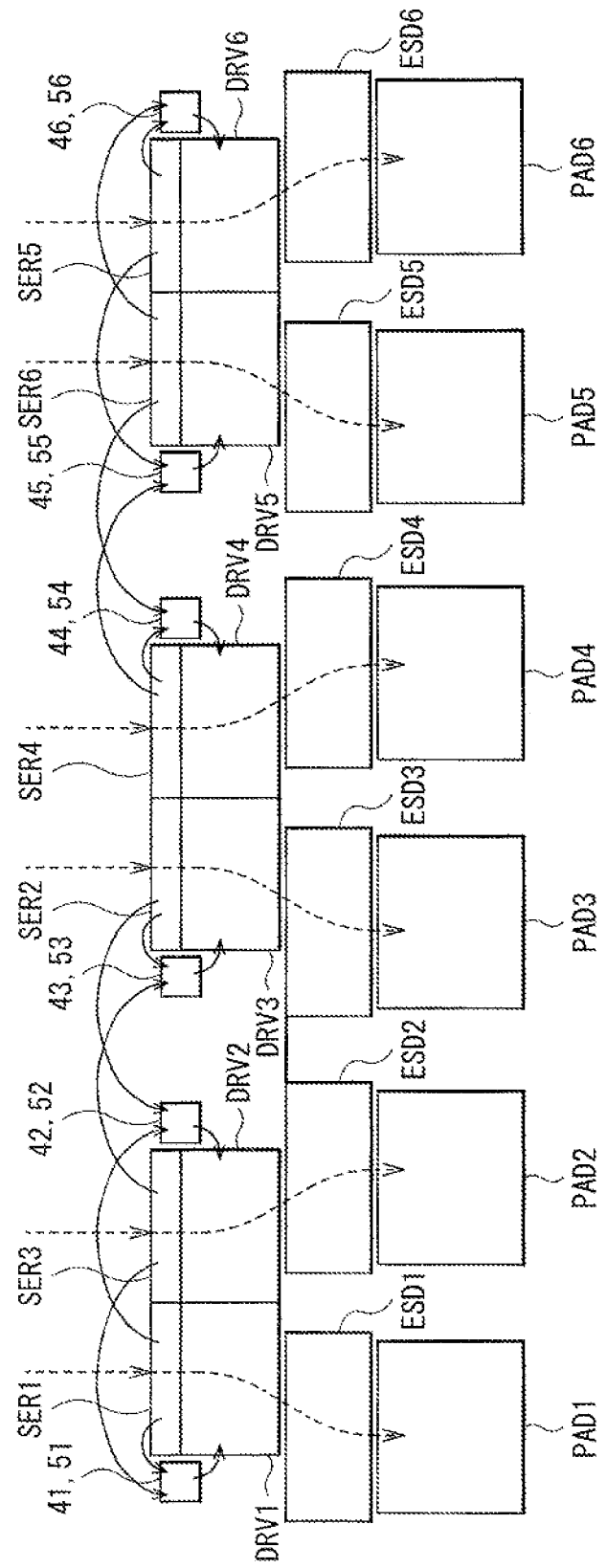

[ FIG. 20 ]
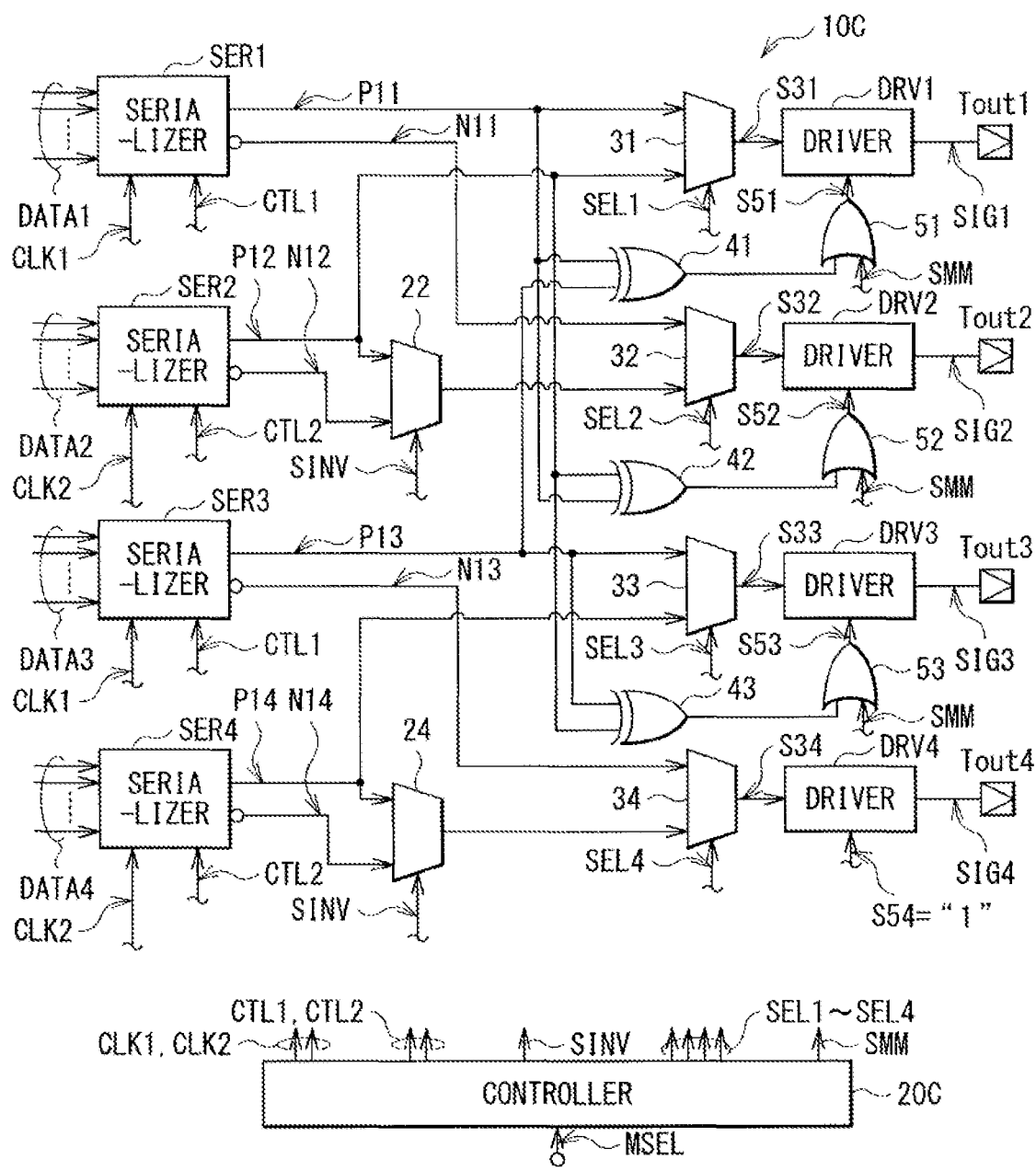

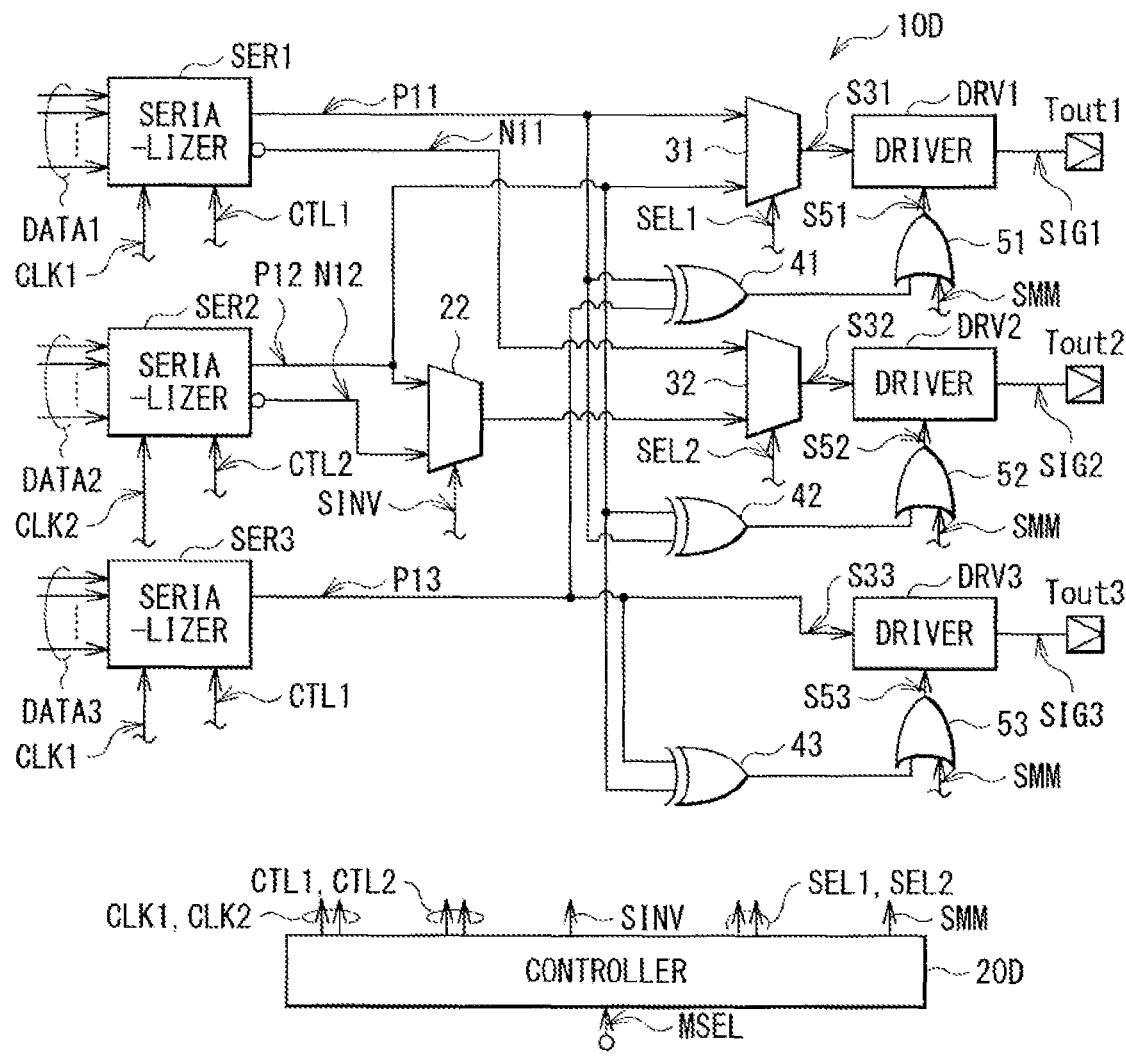
[FIG. 21]

[ FIG. 22 ]
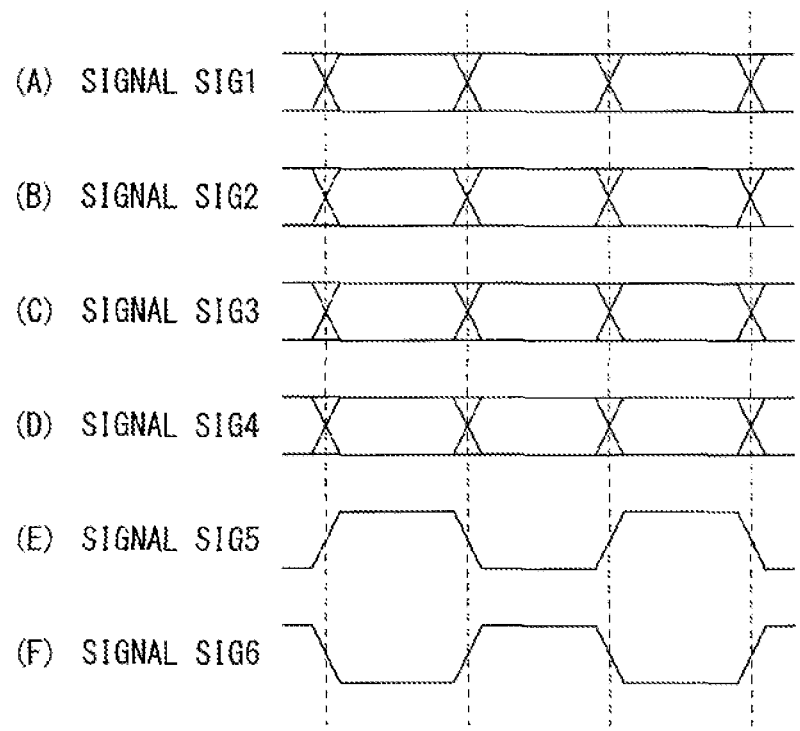
[ FIG. 23 ]
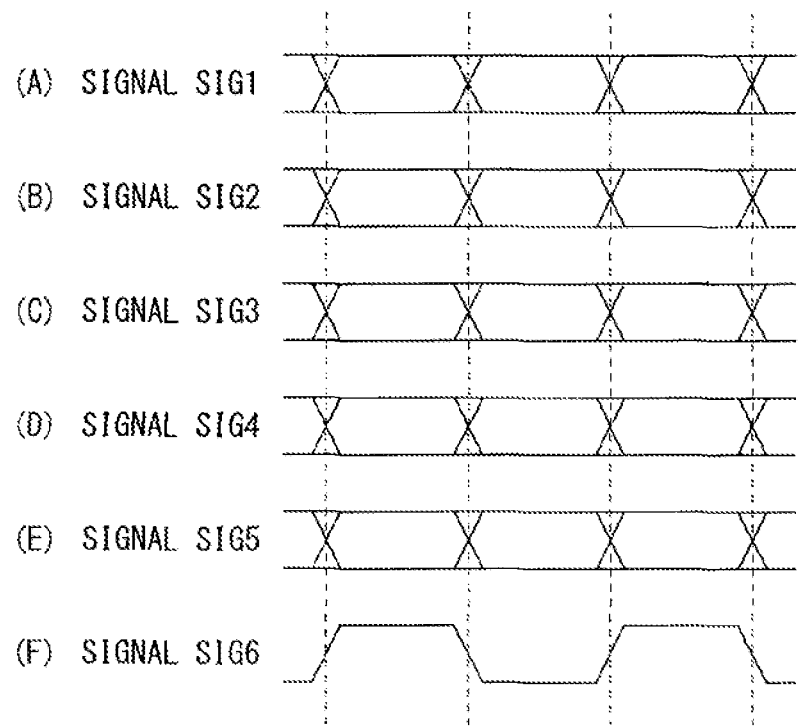

[ FIG. 24 ]
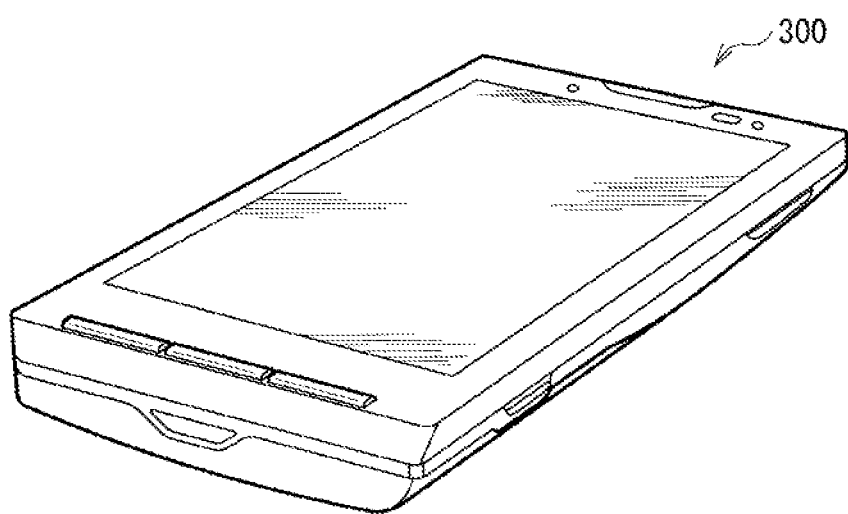

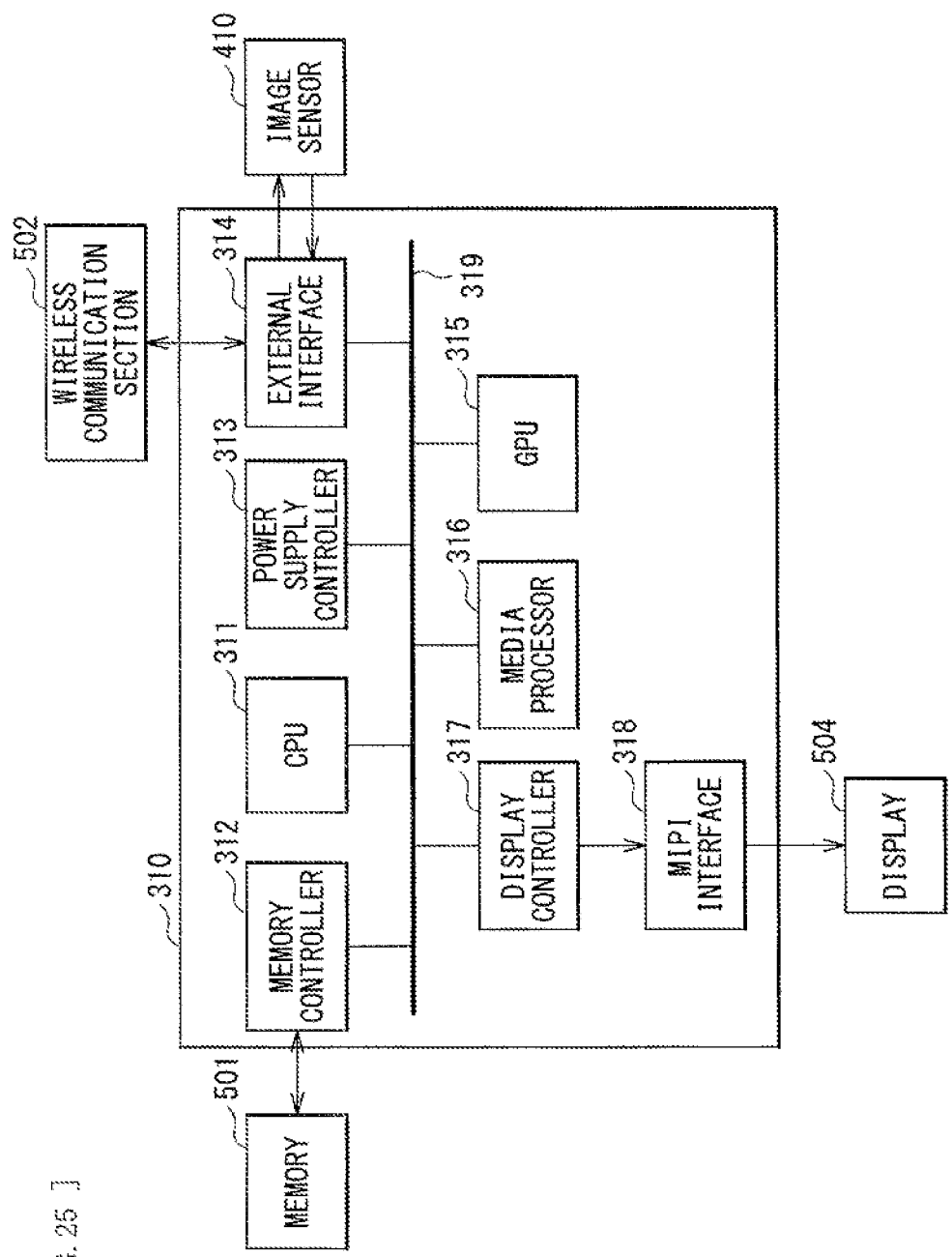
[ FIG. 25 ]

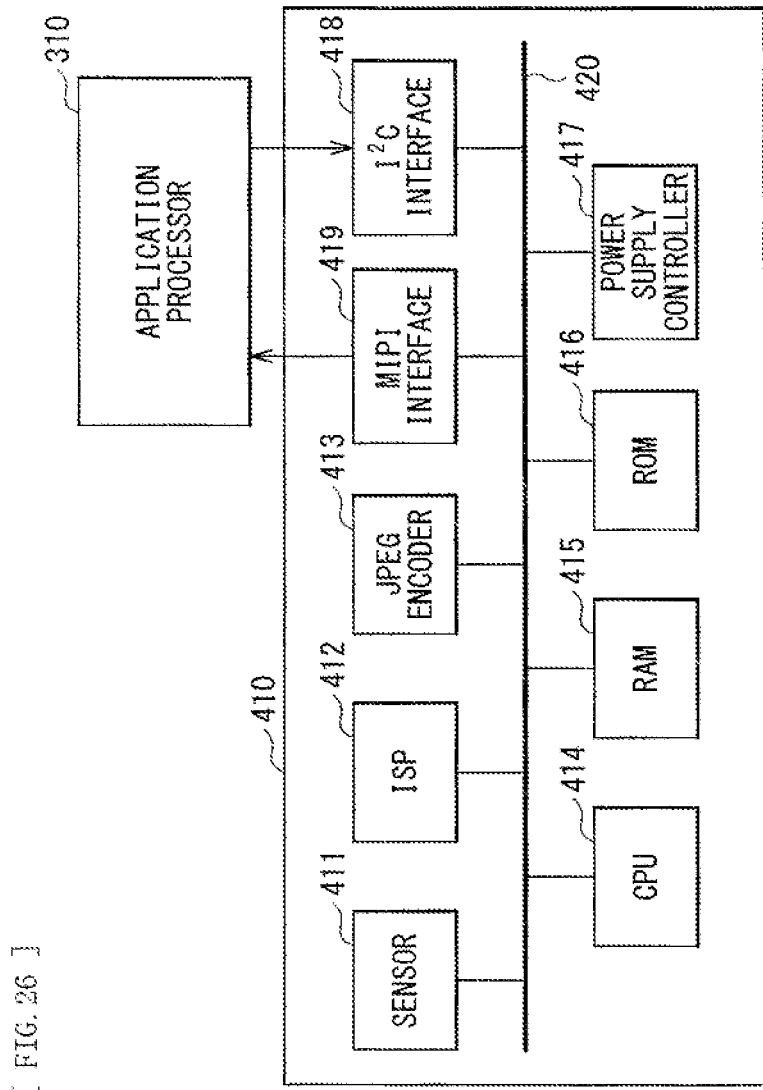
[ FIG. 26 ]

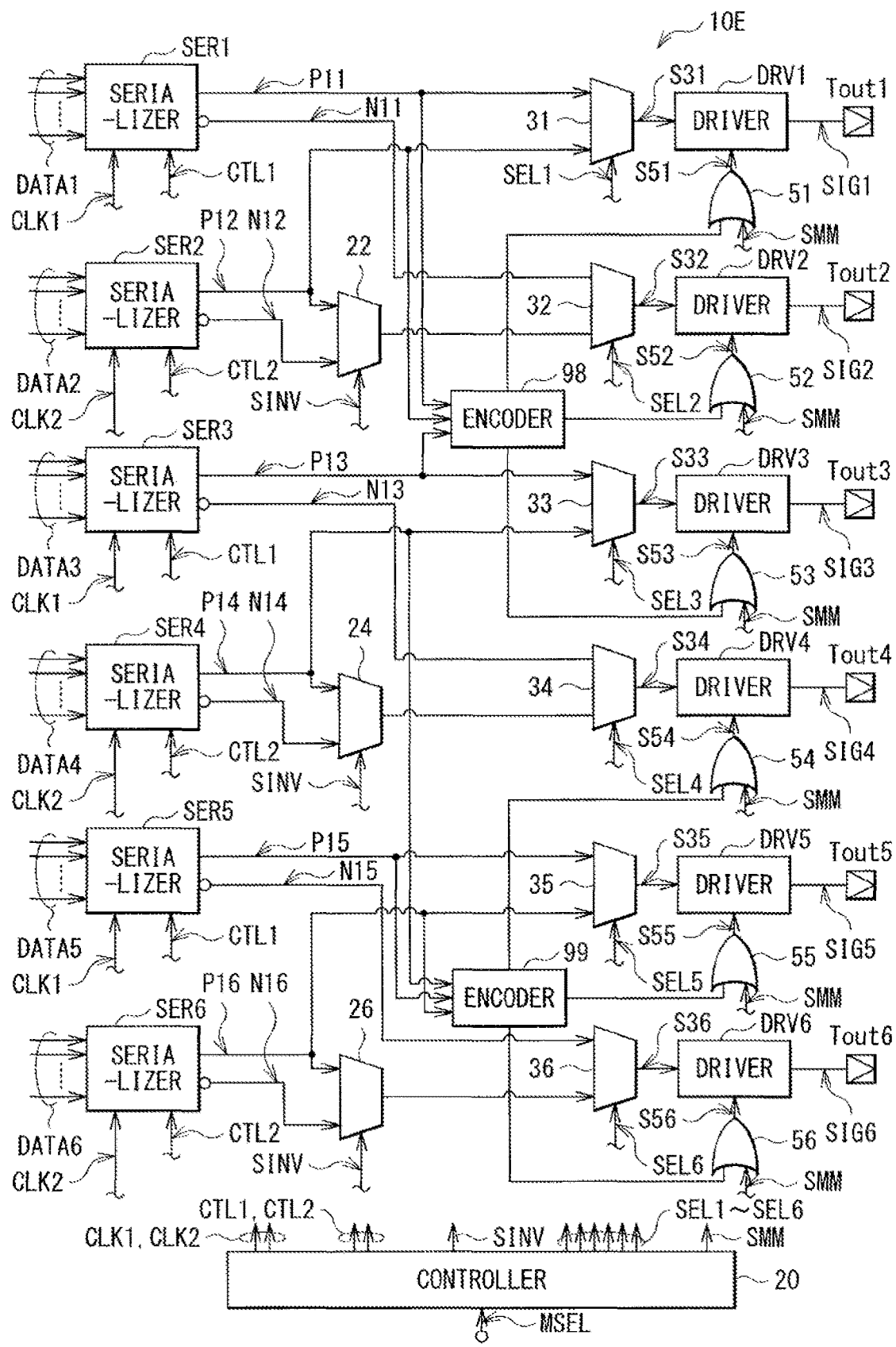
[FIG. 27]

TRANSMISSION DEVICE AND COMMUNICATION SYSTEM

CROSS REFERENCE TO RELATED APPLICATIONS

This is a continuation application is a Continuation Application of application Ser. No. 16/209,493, filed Dec. 4, 2018, which is a Continuation Application of application Ser. No. 15/440,937, filed on Feb. 23, 2017, which is a Continuation Application of application Ser. No. 15/057,422, filed Mar. 1, 2016 and issued as U.S. Pat. No. 9,621,380 Apr. 11, 2017 and which is a continuation of International Application Number PCT/JP2015/056304, filed on Mar. 4, 2015, which contains subject matter related to Japanese Priority Patent Application No. JP 2014-062571, filed Mar. 25, 2014, the entire contents of which are incorporated herein by reference.

TECHNICAL FIELD

The disclosure relates to a transmission device that transmits a signal and a communication system including such a transmission device.

BACKGROUND ART

In association with high functionality and multi-functionality of electronic apparatuses in recent years, the electronic apparatuses include various devices such as a semiconductor chip, a sensor, and a display device. A lot of pieces of data are exchanged between these devices, and the amount of such data has been increased with high functionality and multi-functionality of the electronic apparatuses.

There are disclosed various technologies of a method of exchanging more data. For example, Patent Literatures 1 and 2 each disclose a communication system that exchanges data with use of three voltage levels.

CITATION LIST

Patent Literature

Patent Literature 1: Japanese Unexamined Patent Application Publication (Published Japanese Translation of PCT Application) No. JP2011-517159
Patent Literature 2: Japanese Unexamined Patent Application Publication (Published Japanese Translation of PCT Application) No. JP2010-520715

SUMMARY OF INVENTION

Incidentally, in many cases, electronic apparatuses include devices supplied from various venders. These devices may have different interfaces. Accordingly, it is desirable that a device exchanging data with these devices make it possible to achieve various interfaces.

It is therefore desirable to provide a transmission device and a communication system that make it possible to achieve various interfaces.

A transmission device according to an embodiment of the disclosure includes a first selector, a second selector, a first control signal generator, a first driver, and a second driver. The first selector is configured to select one of a first signal and a second signal, and output the selected one of the first signal and the second signal. The second selector is configured to select one of an inversion signal of the first signal, the second signal, and an inversion signal of the second signal, and output the selected one of the inversion signal of the first signal, the second signal, and the inversion signal of the second signal. The first control signal generator is configured to generate a first control signal, a second control signal, and a third control signal, based on the first signal, the second signal, and a third signal. The first driver is configured to set a voltage of a first output terminal, based on an output signal of the first selector and the first control signal. The second driver is configured to set a voltage of a second output terminal, based on an output signal of the second selector and the second control signal.

A transmission device according to another embodiment of the disclosure includes a controller, a first selector, a second selector, a first driver, and a second driver. The controller is configured to select one of a plurality of operation modes including a first operation mode. The first selector is configured to alternately select a first signal and a second signal in the first operation mode. The second selector is configured to alternately select an inversion signal of the first signal and an inversion signal of the second signal in the first operation mode. The first driver is configured to set a voltage of a first output terminal to one of a first voltage and a second voltage, based on an output signal of the first selector in the first operation mode. The second driver is configured to set a voltage of a second output terminal to one of the first voltage and the second voltage, based on an output signal of the second selector in the first operation mode.

A communication system according to an embodiment of the disclosure includes a transmission device and a reception device. The transmission device includes a first selector, a second selector, a first control signal generator, a first driver, and a second driver. The first selector is configured to select one of a first signal and a second signal, and output the selected one of the first signal and the second signal. The second selector is configured to select one of an inversion signal of the first signal, the second signal, and an inversion signal of the second signal, and output the selected one of the inversion signal of the first signal, the second signal, and the inversion signal of the second signal. The first control signal generator is configured to generate a first control signal, a second control signal, and a third control signal, based on the first signal, the second signal, and a third signal. The first driver is configured to set a voltage of a first output terminal, based on an output signal of the first selector and the first control signal. The second driver is configured to set a voltage of a second output terminal, based on an output signal of the second selector and the second control signal.

In the transmission device and the communication system according to the embodiments of the disclosure, the voltage of the first output terminal is set, based on the output signal of the first selector and the first control signal, and the voltage of the second output terminal is set, based on the output signal of the second selector and the second control signal. The first selector selects one of the first signal and the second signal, and outputs the selected one of the first signal and the second signal, and the second selector selects one of the inversion signal of the first signal, the second signal, and the inversion signal of the second signal and outputs the selected one of the inversion signal of the first signal, the second signal, and the inversion signal of the second signal.

In the transmission device according to another embodiment of the disclosure, in the first operation mode, the voltage of the first output terminal is set, based on the output signal of the first selector, and the voltage of the second output terminal is set, based on the output signal of the second selector. At this occasion, the first selector alternately selects the first signal and the second signal, and the second selector alternately selects the inversion signal of the first signal and the inversion signal of the second signal.

According to the transmission device and the communication system of the embodiments of the disclosure, the voltage of the first output terminal is set, based on the output signal of the first selector and the first control signal, and the voltage of the second output terminal is set, based on the output signal of the second selector and the second control signal. This makes it possible to achieve various interfaces.

According to the transmission device of another embodiment of the disclosure, the operation modes including the first operation mode are provided, and in the first operation mode, the first selector alternately selects the first signal and the second signal, and the second selector alternately selects the inversion signal of the first signal and the inversion signal of the second signal. This makes it possible to achieve various interfaces.

Note that effects described here are non-limiting. Effects achieved by the technology may be one or more of effects described in the disclosure.

BRIEF DESCRIPTION OF DRAWINGS

FIG. 1 is a block diagram of a configuration example of a transmission device according to an embodiment of the disclosure.

FIG. 2 is a block diagram of a configuration example of a transmitter illustrated in FIG. 1.

FIG. 3 is a block diagram of a configuration example of a serializer illustrated in FIG. 2.

FIG. 4 is a block diagram of a configuration example of a driver illustrated in FIG. 2.

FIG. 5 is a circuit diagram of a configuration example of a driver circuit illustrated in FIG. 4.

FIG. 6 is a block diagram of a configuration example of a communication system to which the transmission device illustrated in FIG. 1 is applied.

FIG. 7 is a circuit diagram of a configuration example of a receiver illustrated in FIG. 6.

FIG. 8 is a block diagram of another configuration example of the communication system to which the transmission device illustrated in FIG. 1 is applied.

FIG. 9 is a circuit diagram of a configuration example of a receiver illustrated in FIG. 8.

FIG. 10 is an explanatory diagram of an operation example of the receiver illustrated in FIG. 8.

FIG. 11 is a block diagram of another configuration example of the communication system to which the transmission device illustrated in FIG. 1 is applied.

FIG. 12 is a circuit diagram of a configuration example of a receiver illustrated in FIG. 11.

FIG. 13 is an explanatory diagram of a layout example of respective blocks of the transmitter illustrated in FIG. 2.

FIG. 14A is an explanatory diagram of an operation state in one operation mode of the transmitter illustrated in FIG. 2.

FIG. 14B is an explanatory diagram of another operation state in the one operation mode of the transmitter illustrated in FIG. 2.

FIG. 15 is a timing waveform chart of an operation example of the transmitter illustrated in FIG. 2.

FIG. 16 is an explanatory diagram of an operation example in another mode of the transmitter illustrated in FIG. 2.

FIG. 17 is a table of an operation example in another operation mode of the transmitter illustrated in FIG. 2.

FIG. 18 is an explanatory diagram of an operation example in another operation mode of the transmitter illustrated in FIG. 2.

FIG. 19 is an explanatory diagram of a layout example of respective blocks of a transmitter according to a modification example.

FIG. 20 is a block diagram of a configuration example of a transmitter according to another modification example.

FIG. 21 is a block diagram of a configuration example of a transmitter according to another modification example.

FIG. 22 is a timing waveform chart of an operation example of a transmitter according to another modification example.

FIG. 23 is a timing waveform chart of an operation example of a transmitter according to another modification example.

FIG. 24 is a perspective view of an appearance configuration of a smartphone to which the transmission device according to the embodiment is applied.

FIG. 25 is a block diagram of a configuration example of an application processor to which the transmission device according to the embodiment is applied.

FIG. 26 is a block diagram of a configuration example of an image sensor to which the transmission device according to the embodiment is applied.

FIG. 27 is a block diagram of a configuration example of a transmitter according to another modification example.

MODE FOR CARRYING OUT THE INVENTION

Some embodiments of the disclosure are described in detail below with reference to drawings. Note that description is given in the following order.

1. Embodiment
2. Application Examples (1. Embodiment)

[Configuration Example]

FIG. 1 illustrates a configuration example of a transmission device according to an embodiment. A transmission device 1 is configured to make it possible to achieve a plurality of interfaces. Note that a communication system according to an embodiment of the disclosure may be embodied by this embodiment, and description thereof is therefore given together.

The transmission device 1 may include a processor 9 and a transmitter 10. The processor 9 is adapted to generate six parallel signals DATA1 to DATA6. Each of the parallel signals DATA1 to DATA6 is 7 bits wide in this example. The transmitter 10 is adapted to generate signals SIG1 to SIG6, based on the parallel signals DATA1 to DATA6 and a mode selection signal MSEL, and output the signals SIG1 to SIG6 from output terminals Tout1 to Tout6. Thus, the transmission device 1 generates the signals SIG1 to SIG6, and transmits the signals SIG1 to SIG6 to a reception device (not illustrated) through transmission lines 101 to 106. In this example, each of characteristic impedances of the transmission lines 101 to 106 may be 50 [Ω]. As described later, the transmission device 1 is configured to transmit data to the reception device by means of a differential signal, a three-phase signal, or a single-phase signal.

FIG. 2 illustrates a configuration example of the transmitter 10. The transmitter 10 may include serializers SER1 to SER6, selectors 22, 24, 26, and 31 to 36, exclusive-OR circuits 41 to 46, OR circuits 51 to 56, drivers DRV1 to DRV6, and a controller 20. Note that a signal between these blocks may be a differential signal or a single-phase signal.

The serializers SER1 to SER6 are each adapted to convert a parallel signal into a series signal. More specifically, the serializer SER1 is adapted to serialize the parallel signal DATA1, based on a clock signal CLK1 and a control signal CTL1, to generate a signal P11 and an inversion signal N11 of the signal P11. The serializer SER2 is adapted to serialize the parallel signal DATA2, based on a clock signal CLK2 and a control signal CTL2, to generate a signal P12 and an inversion signal N12 of the signal P12. The serializer SER3 is adapted to serialize the parallel signal DATA3, based on the clock signal CLK1 and the control signal CTL1, to generate a signal P13 and an inversion signal N13 of the signal P13. The serializer SER4 is adapted to serialize the parallel signal DATA4, based on the clock signal CLK2 and the control signal CTL2, to generate a signal P14 and an inversion signal N14 of the signal P14. The serializer SER5 is adapted to serialize the parallel signal DATA5, based on the clock signal CLK1 and the control signal CTL1, to generate a signal P15 and an inversion signal N15 of the signal P15. The serializer SER6 is adapted to serialize the parallel signal DATA6, based on the clock signal CLK2 and the control signal CTL2, to generate a signal P16 and an inversion signal N16 of the signal P16.

FIG. 3 illustrates a configuration example of the serializer SER1. Note that, in the following, description is given of the serializer SER1 as an example, and the same description applies to the serializers SER2 to SER6. The serializer SER1 in this example includes a shift register, and is a so-called 7:1 serializer that serializes the parallel signal DATA1 including seven bit signals D[6] to D[0]. The serializer SER1 is configured to handle a differential signal, and generates the signals P11 and N11 as series signals.

The serializer SER1 may include selectors 71 to 77 and flip-flops 81 to 87. The selectors 71 to 77 are each adapted to output a signal of a first input terminal when a signal at a control terminal is "1" and output a signal of a second input terminal when the signal at the control terminal is "0". The flip-flops 81 to 87 are D-type flip-flops, and are each adapted to sample a signal at an input terminal D at timing of a rising edge of a signal at a clock terminal and output a thus-obtained sampling result from an output terminal Q. The first input terminal, the second input terminal, and the control terminal of the selector 71 are respectively supplied with the signal D[6], "0", and the control signal CTL1. The output terminal of the selector 71 is coupled to the input terminal D of the flip-flop circuit 81. The input terminal of the flip-flop 81 is coupled to the output terminal of the selector 71. The clock terminal of the flip-flop 81 is supplied with the clock signal CTL1. The output terminal Q of the flip-flop 81 is coupled to the second input terminal of the selector 72. The first input terminal of the selector 72 is supplied with the signal D[5]. The second input terminal of the selector 72 is coupled to the output terminal Q of the flip-flop 81. The control terminal of the selector 72 is supplied with the control signal CTL1. The output terminal of the selector 72 is coupled to the input terminal D of the flip-flop 82. The input terminal D of the flip-flop 82 is coupled to the output terminal of the selector 72. The clock terminal of the flip-flop 82 is supplied with the clock signal CLK1. The output terminal Q of the flip-flop 82 is coupled to the second input terminal of the selector 73. As described, in the serializer SER1, the selectors and the flip-flops are alternately coupled to one another. Further, the first input terminal of the selector 77 is supplied with the signal D[0]. The second input terminal of the selector 77 is coupled to the output terminal Q of the flip-flop 86. The control terminal of the selector 77 is supplied with the control signal CTL1. The output terminal of the selector 77 is coupled to the input terminal D of the flip-flop 87. The input terminal D of the flip-flop 87 is coupled to the output terminal of the selector 77. The clock terminal of the flip-flop 87 is supplied with the clock signal CLK1. The output signals P11 and N11 of the serializer SER1 are generated at the output terminal Q of the flip-flop 87.

With this configuration, in the serializer SER1, the control signal CTL1 is set to "1" to cause the flip-flops 81 to 87 to respectively hold the signals D[6] to D[0]. The control signal CTL1 is set to "0" to cause the serializer SER1 to operate as a shift register to output the signals D[0] to D[6] in this order in synchronization with the clock signal CLK1. Thus, the serializer SER1 serializes the parallel signal DATA1 to generate the signals P11 and N11.

The selector 22 is adapted to select and output one of the signals P12 and N12, based on a control signal SINV. The selector 24 is adapted to select and output one of the signals P14 and N14, based on the control signal SINV. The selector 26 is adapted to select and output one of the signals P16 and N16, based on the control signal SINV.

The selector 31 is adapted to select one of the signals P11 and P12, based on a control signal SEL1, and output the thus-selected signal as a signal S31. The selector 32 is adapted to select one of the signal N11 and an output signal of the selector 22 and output the thus-selected signal as a signal S32. The selector 33 is adapted to select one of the signals P13 and P14, based on a control signal SEL3, and output the thus-selected signal as a signal S33. The selector 34 is adapted to select one of the signal N13 and an output signal of the selector 24, based on a control signal SEL4, and output the thus-selected signal as a signal S34. The selector 35 is adapted to select one of the signals P15 and P16, based on a control signal SEL5, and output the thus-selected signal as a signal S35. The selector 36 is adapted to select one of the signal N15 and an output signal of the selector 26, based on a control signal SEL6, and output the thus-selected signal as a signal S36.

The exclusive-OR circuit 41 is adapted to determine an exclusive OR (EX-OR) between the signal P11 and the signal P13 and output a thus-obtained result. The exclusive-OR circuit 42 is adapted to determine an exclusive OR between the signal P11 and the signal P12 and output a thus-obtained result. The exclusive-OR circuit 43 is adapted to determine an exclusive OR between the signal P12 and the signal P13 and output a thus-obtained result. The exclusive-OR circuit 44 is adapted to determine an exclusive OR between the signal P14 and the signal P16 and output a thus-obtained result. The exclusive-OR circuit 45 is adapted to determine an exclusive OR between the signal P14 and the signal P15 and output a thus-obtained result. The exclusive-OR circuit 46 is adapted to determine an exclusive OR between the signal P15 and the signal P16 and output a thus-obtained result.

The OR circuit 51 is adapted to determine an OR between an output signal of the exclusive-OR circuit 41 and a control signal SMM and output a thus-obtained result as a signal S51. The OR circuit 52 is adapted to determine an OR between an output signal of the exclusive-OR circuit 42 and the control signal SMM and output a thus-obtained result as a signal S52. The OR circuit 53 is adapted to determine an OR between an output signal of the exclusive-OR circuit 43 and the control signal SMM and output a thus-obtained result as a signal S53. The OR circuit 54 is adapted to determine an OR between an output signal of the exclusive- OR circuit 44 and the control signal SMM and output a thus-obtained result as a signal S54. The OR circuit 55 is adapted to determine an OR between an output signal of the exclusive-OR circuit 45 and the control signal SMM and output a thus-obtained result as a signal S55. The OR circuit 56 is adapted to determine an OR between an output signal of the exclusive-OR circuit 46 and the control signal SMM and output a thus-obtained signal as a signal S56.

The driver DRV1 is configured to set a voltage of the output terminal Tout1 to one of three voltages (a high-level voltage VH, a low-level voltage VL, and a medium-level voltage VM), based on the signal S31 and the signal S51. The driver DRV2 is configured so as to make a voltage of the output terminal Tout2 settable to one of the three voltages, based on the signal S32 and the signal S52. The driver DRV3 is configured so as to make a voltage of the output terminal Tout3 settable to one of the three voltages, based on the signal S33 and the signal S53. The driver DRV4 is configured so as to make a voltage of the output terminal Tout4 settable to one of the three voltages, based on the signal S34 and the signal S54. The driver DRV5 is configured so as to make a voltage of the output terminal Tout5 settable to one of the three voltages, based on the signal S35 and the signal S55. The driver DRV6 is configured so as to make a voltage of the output terminal Tout6 settable to one of the three voltages, based on the signal S36 and the signal S56.

FIG. 4 illustrates a configuration example of the driver DRV1. Note that, in the following, description is given of the driver DRV1 as an example, and the same description applies to the drivers DRV2 to DRV6. The driver DRV1 may include a driver controller 60 and driver circuits 61 to 65.

The driver controller 60 is adapted to generate signals P61 to P75 and N61 to N65, based on the signals S31 and S51.

The driver circuits 61 to 65 are each adapted to set the voltage of the output terminal Tout1, based on signals supplied to positive input terminals and signals supplied to negative input terminals. The positive input terminal and the negative input terminal of the driver circuit 61 are respectively supplied with the signal P61 and the signal N61. The output terminal of the driver circuit 61 is coupled to the output terminal Tout1. The positive input terminal and the negative input terminal of the driver circuit 62 are respectively supplied with the signal P61 and the signal N62. The output terminal of the driver circuit 62 is coupled to the output terminal Tout1. The positive input terminal and the negative input terminal of the driver circuit 63 are respectively supplied with the signal P63 and the signal N63. The output terminal of the driver circuit 63 is coupled to the output terminal Tout1. The positive input terminal and the negative input terminal of the driver circuit 64 are respectively supplied with the signal P64 and the signal N64. The output terminal of the driver circuit 64 is coupled to the output terminal Tout1. The positive input terminal and the negative input terminal of the driver circuit 65 are respectively supplied with the signal P65 and the signal N65. The output terminal of the driver circuit 65 is coupled to the output terminal Tout1. In other words, the output terminals of the driver circuits 61 to 65 are coupled to one another, and are coupled to the output terminal Tout1.

FIG. 5 illustrates a configuration example of the driver circuit 61. Note that, in the following, description is given of the driver circuit 61 as an example, and the same description applies to the driver circuits 62 to 65. The driver circuit 61 may include transistors 92 and 93 and resistors 91, 94, and 95. The transistors 92 and 93 in this example are N-channel MOS (Metal Oxide Semiconductor)-FETs (Field Effect Transistors). A gate of the transistor 92 corresponds to the positive input terminal of the driver circuit 61, and is supplied with the signal P61. A source of the transistor 92 is coupled to one end of the resistor 91. A drain of the transistor 92 is coupled to a drain of the transistor 93, and is coupled to one end of the resistor 95. A gate of the transistor 93 corresponds to the negative input terminal of the driver circuit 61, and is supplied with the signal N61. A source of the transistor 93 is coupled to one end of the resistor 94. A drain of the transistor 93 is coupled to the drain of the transistor 92, and is coupled to the one end of the resistor 95. The one end of the resistor 91 is coupled to the source of the transistor 92, and the other end of the resistor 91 is supplied with a voltage V1. The voltage V1 may be, for example, 400 [mV]. The one end of the resistor 94 is coupled to the source of the transistor 93, and the other end of the resistor 94 is grounded. The one end of the resistor 95 is coupled to the drains of the transistors 92 and 93, and the other end of the resistor 95 corresponds to the output terminal of the driver circuit 61. In this example, the sum of a resistance value of the resistor 91, a resistance value of on resistance of the transistor 92, and a resistance value of the resistor 95 is about 200 [Ω]. Likewise, in this example, the sum of a resistance value of the resistor 94, a resistance value of on resistance of the transistor 93, and a resistance value of the resistor 95 is about 200 [Ω].

With this configuration, the driver DRV1 sets the voltage of the output terminal Tout1 to one of the three voltages (the high-level voltage VH, the low-level voltage VL, and the medium-level voltage VM), based on the signal S31 and the signal S51. More specifically, in a case where the signal S51 is "1", the driver controller 60 sets the signals P61 to P65 and the signals N61 to N65 in accordance with the signal S31. In other words, in the case where the signal S31 is "1", the driver controller 60 may set, for example, four of the signals P61 to P65 to "1", and may set the remaining one signal and the signals N61 to N65 to "0". Accordingly, in the driver circuits 61 to 65, four transistors 92 of which the gates are supplied with "1" is turned on to set the signal SIG1 to the high-level voltage VH. Moreover, in a case where the signal S31 is "0", the driver controller 60 may set, for example, four of the signals N61 to N65 to "1", and may set the remaining one signal and the signals P61 to P65 to "0". Accordingly, in the driver circuits 61 to 65, four transistors 93 of which the gates are supplied with "1" are turned on to set the signal SIG1 to the low-level voltage VL. Meanwhile, in a case where the signal S51 is "0", irrespective of the signal S31, the driver controller 60 may set, for example, two of the signals P61 to P65 to "1", and may set the remaining signals to "0". Further, the driver controller 60 may set, for example, two of the signals N61 to N65 to "1", and may set the remaining signals to "0". Accordingly, in the driver circuits 61 to 65, two transistors 92 of which the gates are supplied with "1" and two transistors 93 of which the gates are supplied with "1" are turned on to form a Thevenin termination, thereby setting the signal SIG1 to the medium-level voltage VM.

In other words, the signal S51 is a signal that controls whether the signal SIG1 is set to the medium-level voltage VM. In the case where the signal S51 is "0", the driver DRV1 sets the signal SIG to the medium-level voltage VM. Moreover, in the case where the signal S51 is "1", the driver DRV1 sets the signal SIG1 to the high-level voltage VH or the low-level voltage VL in accordance with the signal S31.

Moreover, in the driver DRV1, irrespective of the voltage level of the signal SIG1, four out of ten transistors including the transistors 92 and 93 are turned on. This makes it possible for the driver DRV1 to have an output impedance of about 50 [Ω] irrespective of the voltage level of the signal SIG1, thereby easily achieving impedance matching.

Further, the driver controller 60 may change the number of transistors to be turned on. More specifically, for example, in order to turn on three transistors, the driver controller 60 may set, for example, three signals out of the signals P61 to P65 to "1" to turn on three transistors 92, and may set, for example, three of the signals N61 to N65 to "1" to turn on three transistors 93. Furthermore, for example, in order to turn on five transistors, the driver controller 60 may set all of the signals P61 to P65 to "1" to turn on five transistors 92, and may set all of the signals N61 to N65 to "1" to turn on five transistors 93. Accordingly, in the driver DRV1, it is possible to adjust a slew rate of the output signal SIG1.

The controller 20 is adapted to select one of three operation modes M1 to M3, based on the mode selection signal MSEL, and control the transmitter 10 so that the transmitter 10 operates in the selected operation mode. Here, the operation mode M1 is a mode of transmitting data to the reception device by means of a differential signal. The operation mode M2 is a mode of transmitting data to the reception device by means of a three-phase signal. The operation mode M3 is a mode of transmitting data to the reception device by means of a single-phase signal. The mode selection signal MSEL may be supplied from, for example, outside of the transmission device 1. The controller 20 selects one of the three operation modes M1 to M3, based on the mode selection signal MSEL. The controller 20 generates clock signals CLK1 and CLK2 and control signals CTL1, CTL2, SINV, SEL1 to SEL6, and SMM in accordance with the selected operation mode, and control operation of respective blocks of the transmitter 10 with use of these control signals.

FIG. 6 illustrates a configuration example of a communication system 4 in which the transmitter 10 operates in the operation mode M1. The communication system 4 may include the transmission device 1 and a reception device 110. The reception device 110 may include receivers 111 to 113. In this mode, the drivers DRV1 and DRV2 respectively transmit the signals SIG1 and SIG2 to the receiver 111. The drivers DRV3 and DRV4 respectively transmit the signals SIG3 and SIG4 to the receiver 112. The drivers DRV5 and DRV6 respectively transmit the signals SIG5 and SIG6 to the receiver 113. At this occasion, the signals SIG1 and SIG2 constitute a differential signal. The signals SIG3 and SIG4 constitute a differential signal. The signals SIG5 and SIG6 constitute a differential signal. In other words, for example, one of the signals SIG1 and SIG2 is the high-level voltage VH, and the other one of the signals SIG1 and SIG2 is the low-level voltage VL. Further, the receiver 111 receives the signals SIG1 and SIG2. The receiver 112 receives the signals SIG3 and SIG4. The receiver 113 receives the signals SIG5 and SIG6. Note that, in this example, three receivers 111 to 113 are provided for one reception device 110, and data is transmitted to the reception device 110; however, the embodiment is not limited thereto. Alternatively, for example, one receiver may be provided for each of three reception devices, and data may be transmitted to these three reception devices.

FIG. 7 illustrates a configuration example of the receiver 111. Note that, in the following, description is given of the receiver 111 as an example, and the receivers 112 and 113 are similar to the receiver 111. The receiver 111 may include a resistor 116 and an amplifier 117. The resistor 116 is adapted to function as a termination resistor of the communication system 4, and has a resistance value of about 100 [Ω] in this example. One end of the resistor 116 may be coupled to, for example, an input terminal Tin11, and is supplied with the signal SIG1. The other end of the resistor 116 may be coupled to, for example, an input terminal Tin12, and is supplied with the signal SIG2. The amplifier 117 is adapted to output "1" or "0" in response to a difference between a signal at a positive input terminal and a signal at a negative input terminal. The positive input terminal of the amplifier 117 is coupled to the one end of the resistor and the input terminal Tin11, and is supplied with the signal SIG1. The negative input terminal of the amplifier 117 is coupled to the other end of the resistor 116 and the input terminal Tin12, and is supplied with the signal SIG2.

This configuration allows the communication system 4 to transmit and receive data by means of the differential signals.

FIG. 8 illustrates a configuration example of a communication system 5 in which the transmitter 10 operates in the operation mode M2. The communication system 5 may include the transmission device 1 and a reception device 120. The reception device 120 may include receivers 121 and 122. In this mode, the drivers DRV1 to DRV3 respectively transmit the signals SIG1 to SIG3 to the receiver 121. The drivers DRV4 to DRV6 respectively transmit the signals SIG4 to SIG6 to the receiver 122. At this occasion, the signals SIG1 to SIG3 constitute a three-phase signal, and the signals SIG4 to SIG6 constitute a three-phase signal. In other words, the signals SIG1 to SIG3 are set to voltage levels different from one another (the high-level voltage VH, the low-level voltage VL, and the medium-level voltage VM). The receiver 121 receives the signals SIG1 to SIG3. The receiver 122 receives the signals SIG4 to SIG6.

FIG. 9 illustrates a configuration example of the receiver 121. Note that, in the following, description is given of the receiver 121 as an example, and the receiver 122 is similar to the receiver 121. The receiver 121 may include resistors 124 to 126 and amplifiers 127 to 129. The resistors 124 to 126 are each adapted to function as a termination resistor of the communication system 5, and have a resistance value of about 50 [Ω] in this example. One end of the resistor 124 may be coupled to, for example, an input terminal Tin21, and is supplied with the signal SIG1. One end of the resistor 125 may be coupled to, for example, an input terminal Tin22, and is supplied with the signal SIG2. One end of the resistor 126 may be coupled to, for example, an input terminal Tin23, and is supplied with the signal SIG3. The other end of the resistor 124 is coupled to the other ends of the resistor 125 and the resistor 126. The other end of the resistor 125 is coupled to the other ends of the resistors 124 and 126. The other end of the resistor 126 is coupled to the other ends of the resistors 124 and 126. A positive input terminal of the amplifier 127 is coupled to a negative input terminal of the amplifier 129, the one end of the resistor 126, and the input terminal Tin21, and is supplied with the signal SIG1. A negative input terminal of the amplifier 127 is coupled to a positive input terminal of the amplifier 128, the one end of the resistor 125, and the input terminal Tin22, and is supplied with the signal SIG2. The positive input terminal of the amplifier 128 is coupled to the negative input terminal of the amplifier 127, the one end of the resistor 125, and the input terminal Tin22, and is supplied with the signal SIG2. The negative input terminal of the amplifier 128 is coupled to the positive input terminal of the amplifier 129, the one end of the resistor 126, and the input terminal Tin23, and is supplied with the signal SIG3. The positive input terminal of the amplifier 129 is coupled to the negative input terminal of the amplifier 128, the one end of the resistor 126, and the input terminal Tin23, and is supplied with the signal SIG3.

The negative input terminal of the amplifier 129 is coupled to the positive input terminal of the amplifier 127, the one end of the resistor 124, and the input terminal Tin21, and is supplied with the signal SIG1.

FIG. 10 illustrates an operation example of the receiver 121. In this example, the signal SIG1, the signal SIG2, and the signal SIG3 are respectively the high-level voltage VH, the low-level voltage VL, and the medium-level voltage VM. In this case, a current Iin flows through the input terminal Tin21, the resistor 124, the resistor 125, and the input terminal Tin22 in this order. The positive input terminal and the negative input terminal of the amplifier 127 are respectively supplied with the high-level voltage VH and the low-level voltage VL, and the amplifier 127 outputs "1". Moreover, the positive input terminal and the negative input terminal of the amplifier 128 are respectively supplied with the low-level voltage VL and the medium-level voltage VM, and the amplifier 128 outputs "0". Further, the positive input terminal and the negative input terminal of the amplifier 129 are respectively supplied with the medium-level voltage VM and the high-level voltage VH, and the amplifier 127 outputs "0".

This configuration allows the communication system 5 to transmit and receive data by means of the three-phase signals.

FIG. 11 illustrates a configuration example of a communication system 6 in which the transmitter 10 operates in the operation mode M3. The communication system 6 may include the transmission device 1 and a reception device 130. The reception device 130 may include receivers 131 to 136. In this mode, the drivers DRV1 to DRV6 respectively transmit the signals SIG1 to SIG6 to the receivers 131 to 136. At this occasion, each of the signals SIG1 to SIG6 is a single-phase signal. The receivers 131 to 136 are adapted to respectively receive the signals SIG1 to SIG6.

FIG. 12 illustrates a configuration example of the receiver 131. Note that, in the following, description is given of the receiver 131 as an example, and the receivers 132 to 136 are similar to the receiver 131. The receiver 131 may include a resistor 138 and an amplifier 139. The resistor 138 is adapted to function as a termination resistor of the communication system 6, and has a resistance value of about 50 [Ω] in this example. One end of the resistor 138 may be coupled to, for example, an input terminal Tin31, and is supplied with the signal SIG1. The other end of the resistor 138 is supplied with a bias voltage V2. A positive input terminal of the amplifier 139 is coupled to the one end of the resistor 138 and the input terminal Tin31, and is supplied with the signal SIG1. A negative input terminal of the amplifier 139 is supplied with a bias voltage V3.

This configuration allows the communication system 6 to transmit and receive data by means of the single-phase signals.

Next, description is given of a layout of the transmitter 10.

FIG. 13 illustrates a circuit layout of respective blocks in the transmitter 10. FIG. 13 also illustrates pads PAD1 to PAD6 and ESD (Electro-Static Discharge) protection circuits ESD1 to ESD6. The pads PAD1 to PAD6 correspond to the output terminals Tout1 to Tout6. The ESD protection circuits ESD1 to ESD6 are respectively disposed close to the pads PAD1 to PAD6. Note that the selectors 22, 24, 26, and 31 to 36 are not illustrated in FIG. 13. Solid arrows indicate a flow of a signal from the serializers SER1 to SER6 to the exclusive-OR circuits 41 to 46 and a flow of a signal from the OR circuits 51 to 56 to the drivers DRV1 to DRV6.

In this example, the serializer SER1, the exclusive-OR circuit 41, the OR circuit 51, and the driver DRV1 are disposed close to one another. Likewise, the serializer SER2, the exclusive-OR circuit 42, the OR circuit 52, and the driver DRV2 are disposed close to one another. The serializer SER3, the exclusive-OR circuit 43, the OR circuit 53, and the driver DRV3 are disposed close to one another. The serializer SER4, the exclusive-OR circuit 44, the OR circuit 54, and the driver DRV4 are disposed close to one another. The serializer SER5, the exclusive-OR circuit 45, the OR circuit 55, and the driver DRV5 are disposed close to one another. The serializer SER6, the exclusive-OR circuit 46, the OR circuit 56, and the driver DRV6 are disposed close to one another. In this example, this layout allows the order of layout of the pads PAD1 to PAD6 to be the same as the order of layout of the serializers SER1 to SER6.

Here, the selector 31 corresponds to a specific example of "first selector" in the disclosure, and the selectors 22 and 32 correspond to specific examples of "second selector" in the disclosure. The exclusive-OR circuits 41 to 43 correspond to specific examples of "first control signal generator" in the disclosure. The driver DRV1 corresponds to a specific example of "first driver" in the disclosure, and the driver DRV2 corresponds to a specific example of "second driver" in the disclosure. The operation mode M1 corresponds to a specific example of "first operation mode" in the disclosure. The operation mode M2 corresponds to a specific example of "second operation mode" in the disclosure. The operation mode M3 corresponds to a specific example of "third operation mode" in the disclosure. The high-level voltage VH corresponds to a specific example of "first voltage" in the disclosure. The low-level voltage VL corresponds to a specific example of "second voltage" in the disclosure. The medium-level voltage VM corresponds to a specific example of "third voltage" in the disclosure.

[Operation and Workings]

Next, description is given of operation and workings of the transmission devices 1 according to the embodiment.

(General Operation Outline)

First, general operation outline of the transmission device 1 is described with reference to FIGS. 1 and 2, and other figures. The processor 9 generates six parallel signals DATA1 to DATA6. The transmitter 10 generates the signals SIG1 to SIG6, based on the parallel signals DATA1 to DATA6 and the mode selection signal MSEL, and transmits the signals SIG1 to SIG6 to the reception device through the transmission lines 101 to 106. The controller 20 of the transmitter 10 selects one of three operation modes M1 to M3, based on the mode selection signal MSEL, and controls the transmitter 10 so that the transmitter 10 operates in the selected operation mode.

(Operation Mode M1)

In the operation mode M1, the transmission device 1 transmits data to the reception device by means of the differential signals. In the following, description is given of detailed operation in the operation mode M1.

FIGS. 14A and 14B illustrate an operation example of the transmitter 10 in the operation mode M1. FIG. 14A indicates an operation state, and FIG. 14B indicates another operation state.

In the operation mode M1, the controller 20 generates the clock signals CLK1 and CLK2 and the control signals CTL1 and CTL2. At this occasion, the clock signals CLK1 and CLK2 have phases different by 180° from each other. The controller 20 supplies the clock signal CLK1 and the control signal CTL1 to the serializers SER1, SER3, and SER5 to control the serializers SER1, SER3, and SER5 so that the serializers SER1, SER3, and SER5 respectively serialize the parallel signal DATA1, DATA3, and DATA5. The controller 20 supplies the clock signal CLT2 and the control signal CTL2 to the serializers SER2, SER4, and SER6 to control the serializers SER2, SER4, and SER6 so that the serializers SER2, SER4, and SER6 respectively serialize the parallel signals DATA2, DATA4, and DATA6.

Moreover, the controller 20 supplies the control signal SINV to the selectors 22, 24, and 26 to control the selectors 22, 24, and 26 so that the selectors 22, 24, and 26 respectively select and output the signal N12, the signal N14, and the signal N16.

Further, the controller 20 supplies the control signal SEL1 to the selector 31 to control the selector 31 so that the selector 31 alternately selects and outputs the signal P11 and the signal P12, and the controller 20 supplies the control signal SEL2 to the selector 32 to control the selector 32 so that the selector 32 alternately selects and outputs the signal N11 and the output signal (the signal N12) of the selector 22. At this occasion, the controller 20 controls the selectors 31 and 32 so that the selector 32 selects the signal N11 when the selector 31 selects and outputs the signal P11 (see FIG. 14A) and the selector 32 selects the signal N12 when the selector 31 selects and outputs the signal P12 (see FIG. 14B).

FIG. 15 illustrates a timing waveform chart of an operation example of the selectors 31 and 32. (A) of FIG. 15 indicates a waveform of the signal P11 or the signal N11, (B) of FIG. 15 indicates a waveform of the signal P12 or the signal N12, and (C) of FIG. 15 indicates a waveform of the signal S31 or the signal S32. In this example, the serializer SER1 outputs data S0, S2, S4, . . . as the signals P11 and N11 in this order in synchronization with the clock signal CLK1. The serializer SER2 outputs data S1, S3, S5, . . . as the signals P12 and N12 in this order in synchronization with the clock signal CLK2. At this occasion, since the phases of the clock signals CLK1 and CLK2 are different by 180° from each other, transition timing of the signals P11 and N11 is different from transition timing of the signals P12 and N12. In a period T1 in which data in the signals P11 and N11 are stable (see (A) of FIG. 15), the selector 31 selects the signal P11 and outputs the signal P11 as the signal S31, and the selector 32 selects the signal N11 and outputs the signal N11 as the signal S32 (see (C) of FIG. 15). Moreover, in a period T2 in which data in the signals P12 and N12 are stable (see (B) of FIG. 15), the selector 31 selects the signal P12 and outputs the signal P12 as the signal S31, and the selector 32 selects the signal N12 and outputs the signal N12 as the signal S32 (see (C) of FIG. 15). Here, since the signal N11 and the signal N12 are respectively the inversion signal of the signal P11 and the inversion signal of the signal P12, the signal S32 is an inversion signal of the signal S31. As a result of such operation, data S0, S1, S2, . . . are disposed in this order in the signals S31 and 32. In other words, in the operation mode M1, the selectors 31 and 32 function as 2:1 serializers.

Likewise, the controller 20 supplies the control signal SEL3 to the selector 33 to control the selector 33 so that the selector 33 alternately selects and outputs the signal P13 and the signal P14, and the controller 20 supplies the control signal SEL4 to the selector 34 to control the selector 34 so that the selector 34 alternately selects and outputs the signal N13 and the output signal (the signal N14) of the selector 24. Moreover, the controller 20 supplies the control signal SEL5 to the selector 35 to control the selector 35 so that the selector 35 alternately selects and outputs the signal P15 and the signal P16, and the controller 20 supplies the control signal SEL6 to the selector 36 to control the selector 36 so that the selector 36 alternately selects and outputs the signal N15 and the output signal (the signal N16) of the selector 26.

Further, the controller 20 supplies the control signal SMM indicating "1" to the OR circuits 51 to 56. Accordingly, the signals S51 to S56 are set to "1". As a result, the drivers DRV1 to DRV6 respectively set the signals SIG1 to SIG6 to the high-level voltage VH or the low-level voltage VL in accordance with the signals S31 to S36. At this occasion, since the signal S31 and the signal S32 are inverted from each other, the signals SIG1 and SIG2 constitute a differential signal. Likewise, the signals SIG3 and SIG4 constitute a differential signal, and the signals SIG5 and SIG6 constitute a differential signal.

Thus, in the operation mode M1, the transmission device 1 transmits data to the reception device by means of the differential signals.

(Operation Mode M2)

In the operation mode M2, the transmission device 1 transmits data to the reception device by means of the three-phase signals. Description is given of detailed operation in the operation mode M2.

FIG. 16 illustrates an operation example of the transmitter 10 in the operation mode M2. In the operation mode M2, the controller 20 generates the clock signals CLK1 and CLK2 and the control signals CTL1 and CTL2. Here, the clock signals CLK1 and CLK2 have phases that are substantially equal to each other. The controller 20 supplies the clock signal CLK1 and the control signal CTL1 to the serializers SER1, SER3, and SER5 to control the serializers SER1, SER3, and SER5 so that the serializers SER1, SER3, and SER5 respectively serialize the parallel signals DATA1, DATA3, and DATA5. The controller 20 supplies the clock signal CLK2 and the control signal CTL2 to the serializers SER2, SER4, and SER6 to control the serializers SER2, SER4, and SER6 so that the serializers SER2, SER4, and SER6 respectively serialize the parallel signals DATA2, DATA4, and DATA6.

Moreover, the controller 20 supplies the control signal SINV to the selectors 22, 24, and 26 to control the selectors 22, 24, and 26 so that the selectors 22, 24, and 26 respectively select and output the signal P12, the signal P14, and the signal P16.

Moreover, the controller 20 supplies the control signal SEL1 to the selector 31 to control the selector 31 so that the selector 31 selects the signal P11 and outputs the signal P11 as the signal S31. The controller 20 supplies the control signal SEL2 to the selector 32 to control the selector 32 so that the selector 32 selects the output signal (the signal P12) of the selector 22 and output the output signal as the signal S32. The controller 20 supplies the control signal SEL3 to the selector 33 to control the selector 33 so that the selector 33 selects the signal P13 and outputs the signal P13 as the signal S33. Likewise, the controller 20 supplies the control signal SEL4 to the selector 34 to control the selector 34 so that the selector 34 selects the output signal (the signal P14) of the selector 24 and outputs the output signal as the signal S34. The controller 20 supplies the control signal SEL5 to the selector 35 to control the selector 35 so that the selector 35 selects the signal P15 and outputs the signal P15 as the signal S35. The controller 20 supplies the control signal SEL6 to the selector 36 to control the selector 36 so that the selector 36 selects the output signal (the signal P16) of the selector 26 and outputs the output signal as the signal S36.

Further, the controller 20 supplies the control signal SMM indicating "0" to the OR circuits 51 to 56. Accordingly, the signals S51 to S56 are set to the same signals as the output signals of the exclusive-OR circuits 41 to 46. As a result, the drivers DRV1 to DRV3 set the signals SIG1 to SIG3 to three different voltages (the high-level voltage VH, the low-level voltage VL, and the medium-level voltage VM), based on the signals S31 to S33 and the signals S51 to S53. Likewise, the drivers DRV4 to DRV6 set the signals SIG4 to SIG6 to three different voltages (the high-level voltage VH, the low-level voltage VL, and the medium-level voltage VM), based on the signals S34 to S36 and the signals S54 to S56.

FIG. 17 illustrates operation of the exclusive-OR circuits 41 to 43 and the drivers DRV1 to DRV3. Note that the exclusive-OR circuits 44 to 46 and the drivers DRV4 to DRV6 operate similarly to the exclusive-OR circuits 41 to 43 and the drivers DRV1 to DRV3.

For example, in a case where the signal P11 is "1" and the signals P12 and P13 are both "0", the signals S51 and S52 are both set to "1", and the signal S53 is set to "0". Accordingly, since the signal S31 (the signal P11) is "1" and the signal S51 is "1", the driver DRV1 sets the signal SIG1 to the high-level voltage VH. Moreover, since the signal S32 (the signal P12) is "0" and the signal S52 is "1", the driver DRV2 sets the signal SIG2 to the low-level voltage VL. Further, since the signal S53 is "0", the driver DRV3 sets the signal SIG3 to the medium-level voltage VM.

For example, in a case where the signals P11 and P13 are both "0" and the signal P12 is "1", the signal S51 is set to "0", and the signals S52 and S53 are both set to "1". Accordingly, since the signal S51 is "0", the driver DRV1 sets the signal SIG1 to the medium-level voltage VM. Moreover, since the signal S32 (the signal P12) is "1" and the signal S52 is "1", the driver DRV2 sets the signal SIG2 to the high-level voltage VH. Further, since the signal S33 (the signal P13) is "0" and the signal S53 is "1", the driver DRV3 sets the signal SIG3 to the low-level voltage VL.

For example, in a case where the signals P11 and P12 are both "0" and the signal P13 is "1", the signals S51 and S53 are both set to "1", and the signal S52 is set to "0". Accordingly, since the signal S31 (the signal P11) is "0" and the signal S51 is "1", the driver DRV1 sets the signal SIG1 to the low-level voltage VL. Moreover, since the signal S52 is "0", the driver DRV2 sets the signal SIG2 to the medium-level voltage VM. Further, since the signal S33 (the signal P13) is "1" and the signal S53 is "1", the driver DRV3 sets the signal SIG3 to the high-level voltage VH.

Thus, in the operation mode M2, the transmission device 1 transmits data to the reception device by means of the three-phase signals.

(Operation Mode M3)

In the operation mode M3, the transmission device 1 transmits data to the reception device by means of the single-phase signals. In the following, description is given of detailed operation in the operation mode M3.

FIG. 18 illustrates an operation example of the transmitter 10 in the operation mode M3. In the operation mode M3, the controller 20 generates the clock signals CLK1 and CLK2 and the control signals CTL1 and CTL2. In this example, the clock signals CLK1 and CLK2 have phases that are substantially equal to each other. The controller 20 supplies the clock signal CLK1 and the control signal CTL1 to the serializers SER1, SER3, and SER5 to control the serializers SER1, SER3, and SER5 so that the serializers SER1, SER3, and SER5 respectively serialize the parallel signals DATA1, DATA3, and DATA5. The controller 20 supplies the clock signal CLK2 and the control signal CTL2 to the serializers SER2, SER4, and SER6 to control the serializers SER2, SER4, and SER6 so that the serializers SER2, SER4, and SER6 respectively serialize the parallel signals DATA2, DATA4, and DATA6.

Moreover, the controller 20 supplies the control signal SINV to the selectors 22, 24, and 26 to control the selectors 22, 24, and 26 so that the selectors 22, 24, and 26 respectively select and output the signal P12, the signals P14, and the signal P16.

Further, the controller 20 supplies the control signal SEL1 to the selector 31 to control the selector 31 so that the selector 31 selects the signal P11 and outputs the signal P11 as the signal S31. Furthermore, the controller 20 supplies the control signal SEL2 to the selector 32 to control the selector 22 so that the selector 22 selects the output signal (the signal P12) of the selector 22 and outputs the output signal as the signal S32. The controller 20 supplies the control signal SEL3 to the selector 33 to control the selector 33 so that the selector 33 selects the signal P13 and outputs the signal P13 as the signal S33. The controller 20 supplies the control signal SEL4 to the selector 34 to control the selector 34 so that the selector 34 selects the output signal (the signal P14) of the selector 24 and outputs the output signal as the signal S34. The controller 20 supplies the control signal SEL5 to the selector 35 to control the selector 35 so that the selector 35 selects the signal P15 and outputs the signal P15 as the signal S35. The controller 20 supplies the control signal SEL6 to the selector 36 to control the selector 36 so that the selector 36 selects the output signal (the signal P16) of the selector 26 and outputs the output signal as the signal S36.

Further, the controller 20 supplies the control signal SMM indicating "1" to the OR circuits 51 to 56. Accordingly, the signals S51 to S56 are set to "1". As a result, the drivers DRV1 to DRV6 set the signals SIG1 to SIG6 to the high-level voltage VH or the low-level voltage VL in accordance with the signals S31 to S36.

Thus, in the operation mode M1, the transmission device 1 transmits data to the reception device by means of the single-phase signals.

As described, the transmission device 1 has a plurality of operation modes M1 to M3 to make it possible to transmit data to the reception device by means of the differential signals, the three-phase signals, and the single-phase signals, thereby achieving various interfaces.

Accordingly, it is possible to enhance, for example, the degree of freedom of system design of electronic apparatuses. More specifically, for example, in a case where the transmitter 10 is mounted in a processor, an electronic apparatus may be configured with use of a peripheral device provided for three-phase signals, or an electronic apparatus may be configured with use of a peripheral device provided for differential signals. Moreover, for example, since various interfaces are achievable by one processor, it is not necessary to provide a processor for each of the interfaces. It is therefore possible to reduce the number of kinds of processors and reduce costs. Further, the serializers SER1 to SER6, the selectors 31 to 36, the drivers DRV1 to DRV6, and other components are shared by the operation modes M1 to M3, which makes it possible to reduce necessary area for circuit layout, in comparison with a case where different circuits are provided for different interfaces.

[Effects]

As described, in the embodiment, a plurality of operation modes are provided, and it is possible to transmit data to the reception device by means of the differential signals, the three-phase signals, and the single-phase signals. It is therefore possible to achieve various interfaces.

Modification Example 1

In the foregoing embodiment, as illustrated in FIG. 13, the order of layout of the pads PAD1 to PAD6 is the same as the order of layout of the serializers SER1 to SER6; however, the order of layout of the pads PAD1 to PAD6 and the order of layout of the serializers SER1 to SER6 are not limited thereto. Alternatively, for example, as illustrated in FIG. 19, the order of layout of the pads PAD1 to PAD6 may be different from the order of layout of the serializers SER1 to SER6. In this example, the serializer SER3, the exclusive-OR circuit 42, the OR circuit 52, and the driver DRV2 are disposed close to one another. The serializers SER2, the exclusive-OR circuit 43, the OR circuit 53, and the driver DRV3 are disposed close to one another. The serializer SER6, the exclusive-OR circuit 44, the OR circuit 55, and the driver DRV5 are disposed close to one another. The serializer SER5, the exclusive-OR circuit 46, the OR circuit 56, and the driver DRV6 are disposed close to one another. In other words, in the example in FIG. 19, the serializer SER2 and the serializer SER3 in the example in FIG. 13 are replaced by each other, and the serializer SER5 and the serializer SER6 in the example in FIG. 13 are replaced by each other. In this modification example, it is therefore possible to reduce variation in lengths of signal paths from the serializers SER1 to SER6 to the exclusive-OR circuits 41 to 46. In other words, in the example in FIG. 13, a signal path from the serializer SER3 to the exclusive-OR circuit 41 is longer than other signal paths. This may delay a signal that passes through this signal path, resulting in disturbance of waveforms of the signal SIG1 and other signals. In contrast, in the modification example (see FIG. 19), it is possible to reduce variation in the lengths of the signal paths from the serializers SER1 to SER6 to the exclusive-OR circuits 41 to 46, making it possible to reduce a possibility of disturbance of waveforms of the signal SIG1 to SIG6.

Modification Example 2

In the foregoing embodiment, the controller 20 controls the operation of the serializers SER1 to SER6 in accordance with the operation modes M1 to M3. At this occasion, for example, an operation frequency may be changed in accordance with the operation modes M1 to M3. Moreover, for example, the number of flip-flops to be used out of the flip-flops 81 to 87 may be changed. For example, in order to use five flip-flops out of the flip-flops 81 to 87 in the serializer SER1, first, the processor 9 supplies the signals D[4] to D[0] as the parallel signal DATA1 to the serializer SER1. In the serializer SER1, the control signal CTL1 is set to "1" to cause the flip-flops 83 to 87 to respectively hold the signals D[4] to D[0]. Further, the control signal CTL1 is set to "0" to cause the serializer SER1 to output the signals D[0] to D[4] in this order in synchronization with the clock signal CLK1. Thus, the serializer SER1 operates as a 5:1 serializer.

Modification Example 3

In the foregoing embodiment, six drivers DRV1 to DRV6 are provided in the transmitter 10; however, the number of drivers is not limited thereto. Alternatively, for example, as in a transmitter 10C illustrated in FIG. 20, four drivers DRV1 to DRV4 may be provided. The transmitter 10C is similar to the transmitter 10 (see FIG. 2) according to the foregoing embodiment with the exception that the serializers SER5 and SER6, the selectors 26, 35, and 36, the exclusive-OR circuits 44 to 46, the OR circuits 55 and 56, and the drivers DRV5 and DRV6 are removed therefrom. In this example, the signal S54 to be supplied to the driver DRV4 is set to "1". A controller 20C generates the clock signals CLK1 and CLK2, and the control signals CTL1, CTL2, SINV, SEL1 to SEL4, and SMM in accordance with the operation modes M1 to M3, and controls operation of respective blocks of the transmitter 10C with use of these control signals. Accordingly, in the transmitter 10C in the operation mode M1, the signals SIG1 and SIG2 constitute a differential signal, and the signals SIG3 and SIG4 constitute a differential signal. Moreover, in the operation mode M2, the signals SIG1 to SIG3 constitute a three-phase signal. In the operation mode M3, each of the signals SIG1 to SIG4 is a single-phase signal.

Moreover, for example, as in a transmitter 10D illustrated in FIG. 21, three drivers DRV1 to DRV3 may be provided. The transmitter 10D is similar to the transmitter 10 (see FIG. 2) according to the foregoing embodiment with the exception that the serializers SER4 to SER6, the selectors 24, 26, and 33 to 36, the exclusive-OR circuits 44 to 46, the OR circuits 54 to 56, and the drivers DRV4 to DRV6 are removed therefrom. In the transmitter 10, the output signal P13 of the serializer SER3 is supplied to the driver DRV3 through the selector 33, whereas, in the transmitter 10D, the output signal P13 of the serializer SER3 is directly supplied to the driver DRV3. The controller 20D generates the clock signals CLK1 and CLK2, and the control signals CTL1, CTL2, SINV, SEL1, SEL2, and SMM in accordance with the operation modes M1 to M3, and controls operation of respective blocks of the transmitter 10D with use of these control signals. Accordingly, in the transmitter 10D in the operation mode M1, the signals SIG1 and SIG2 constitute a differential signal. Moreover, in the operation mode M2, the signals SIG1 to SIG3 constitute a three-phase signal. In the operation mode M3, each of the signals SIG1 to SIG3 is a single-phase signal.

Modification Example 4

In the foregoing embodiment, the processor 9 generates six parallel signals DATA1 to DATA6. At this occasion, the processor 9 may encode data by, for example, a conversion scheme such as 8b/10b to generate these parallel signals DATA1 to DATA6. This makes it possible to easily perform clock recovery in the reception device. Moreover, for example, in accordance with the operation modes M1 to M3, the processor 9 may be configured to determine whether data is to be encoded or to change an encoding scheme.

Modification Example 5

In the foregoing embodiment, the signals SIG1 to SIG6 are generated and transmitted to the reception device. At this occasion, one or more of the signals SIG1 to SIG6 may have an alternating pattern of the voltage VH and the voltage VL. This allows the reception device to use the signal as the clock signal. More specifically, for example, in the operation mode M1, the signals SIG5 and SIG6 may be differential clock signals, as illustrated in FIG. 22. Moreover, for example, in the operation mode M3, the signal SIG6 may be a clock signal, as illustrated in FIG. 23. Further, in FIG. 23, setting the signal SIG5 as an inversion signal of the signal SIG6 may allow each of the signals SIG1 to SIG4 to be a single-phase signal, while allowing each of the signals SIG5 and SIG6 to be a differential clock signal.

(2. Application Examples)

Next, description is given of application examples of the transmission devices described in the foregoing embodiment and the foregoing modification examples.

FIG. 24 illustrates an appearance of a smartphone 300 (a multi-functional mobile phone) to which the transmission device according to the foregoing embodiment or any other embodiment is applied. Various devices are mounted in the smartphone 300. The transmission device according to the foregoing embodiment or any other embodiment is applied to a communication system that exchanges data between these devices.

FIG. 25 illustrates a configuration example of an application processor 310 used in the smartphone 300. The application processor 310 may include a CPU (Central Processing Unit) 311, a memory controller 312, a power supply controller 313, an external interface 314, a GPU (Graphics Processing Unit) 315, a media processor 316, a display controller 317, and a MIPI (Mobile Industry Processor Interface) interface 318. In this example, the CPU 311, the memory controller 312, the power supply controller 313, the external interface 314, the GPU 315, the media processor 316, and the display controller 317 are coupled to a system bus 310 to allow for data exchange through the system bus 319.

The CPU 311 is adapted to process various pieces of information handled in the smartphone 300 in accordance with a program. The memory controller 312 is adapted to control the memory 501 used when the CPU 311 performs information processing. The power supply controller 313 is adapted to control a power supply of the smartphone 300.

The external interface 314 is an interface for communication with external devices. In this example, the external interface 314 is coupled to a wireless communication section 502 and an image sensor 503. The wireless communication section 502 is adapted to carry out wireless communication with mobile phone base stations. The wireless communication section 502 may include, for example, a baseband section, an RF (Radio Frequency) front end section, and other components. The image sensor 503 is adapted to acquire an image, and may include, for example, a CMOS sensor.

The GPU 315 is adapted to perform image processing. The media processor 316 is adapted to process information such as voice, characters, and graphics. The display controller 317 is adapted to control the display 504 through the MIPI interface 318. The MIPI interface 318 is adapted to transmit an image signal to the display 504. As the image signal, for example, a YUV-format signal, an RGB-format signal, or any other format signal may be used. For example, the transmission device according to the foregoing embodiment or any other embodiment may be applied to the MIPI interface 318.

FIG. 26 illustrates a configuration example of the image sensor 410. The image sensor 410 may include a sensor 411, an ISP (Image Signal Processor) 412, a JPEG (Joint Photographic Experts Group) encoder 413, a CPU 414, a RAM (Random Access Memory) 415, a ROM (Read Only Memory) 416, a power supply controller 417, an I²C (Inter-Integrated Circuit) interface 418, and an MIPI interface 419. In this example, these blocks are coupled to a system bus 420 to allow for data exchange through the system bus 420.

The sensor 411 is adapted to acquire an image, and may be configured of, for example, a CMOS sensor. The ISP 412 is adapted to perform predetermined processing on the image acquired by the sensor 411. The JPEG encoder 413 is adapted to encode the image processed by the ISP 412 to generate a JPEG-format image. The CPU 414 is adapted to control respective blocks of the image sensor 410 in accordance with a program. The RAM 415 is a memory used when the CPU 414 performs information processing. The ROM 416 is adapted to store a program to be executed in the CPU 414. The power supply controller 417 is adapted to control a power supply of the image sensor 410. The I²C interface 418 is adapted to receive a control signal from the application processor 310. Although not illustrated, the image sensor 410 is adapted to also receive a clock signal from the application processor 310, in addition to the control signal. More specifically, the image sensor 410 is configured to be operable, based on clock signals of various frequencies. The MIPI interface 419 is adapted to transmit an image signal to the application processor 310. As the image signal, for example, a YUV-format signal, an RGB-format signal, or any other format signal may be used. For example, the transmission device according to the foregoing embodiment or any other embodiment may be applied to the MIPI interface 419.

Although the technology has been described above with reference to the example embodiments, the modification examples, and the application examples to electronic apparatuses, the technology is not limited thereto, and may be modified in a variety of ways.

For example, in the foregoing embodiments, the exclusive-OR circuits 41 to 46 are provided. However, the embodiment is not limited thereto. As in a transmitter 10E illustrated in FIG. 27, an encoder 98 and an encoder 99 may be provided in place of the exclusive-OR circuits 41 to 46. The encoder 98 is adapted to operate based on the signals P11 to P13, and the encoder 99 is adapted to operate based on the signals P14 to P16. The encoders 98 and 99 are configured to achieve the operation illustrated in FIG. 17. Moreover, for example, the encoder 98 may be configured to operate based on all or some of the signals P11 to P13 and N11 to N13. Likewise, for example, the encoder 99 may be configured to operate based on all or some of the signals P14 to P16 and N14 to N16.

Moreover, for example, in the foregoing embodiments, each of the drivers DRV1 to DRV6 includes five driver circuits 61 to 65. However, the number of driver circuits is not limited thereto. Alternatively, each of the drivers DRV1 to DRV6 may include four or less driver circuits or six or more driver circuits.

Further, for example, in the foregoing embodiments, the driver controller 60 turns on two transistors 92 and two transistors 93 in the driver circuits 61 to 65 in the operation mode M2, in the case where the signal S51 is "0". However, the embodiments are not limited thereto. Alternatively, all of the transistors 92 and 93 may be turned off. For example, in a case where all of the transistors 92 and 93 of the driver DRV1 are turned off, for example, output impedance of the driver DRV1 is turned to high impedance. Accordingly, the signal SIG1 is set to the medium-level voltage VM through the resistors 124 to 126 of the receiver 121 (see FIG. 9).

Note that the effects described in the present specification are illustrative and non-limiting. Effects achieved by the technology may be effects other than those described above.

It is to be noted that the technology may include the following configurations.

(1) A transmission device including:
a first selector configured to select one of a first signal and a second signal, and output the selected one of the first signal and the second signal;
a second selector configured to select one of an inversion signal of the first signal, the second signal, and an inversion signal of the second signal, and output the selected one of the inversion signal of the first signal, the second signal, and the inversion signal of the second signal;

a first control signal generator configured to generate a first control signal, a second control signal, and a third control signal, based on the first signal, the second signal, and a third signal;
a first driver configured to set a voltage of a first output terminal, based on an output signal of the first selector and the first control signal; and
a second driver configured to set a voltage of a second output terminal, based on an output signal of the second selector and the second control signal.

(2) The transmission device according to (1), wherein
a plurality of operation modes including a first operation mode are provided, and
in the first operation mode,
the first selector alternately selects the first signal and the second signal,
the second selector selects the inversion signal of the first signal when the first selector selects the first signal, and selects the inversion signal of the second signal when the first selector selects the second signal,
the first driver selectively sets the voltage of the first output terminal to one of a first voltage and a second voltage, based on the output signal of the first selector, and
the second driver selectively sets the voltage of the second output terminal to one of the first voltage and the second voltage, based on the output signal of the second selector.

(3) The transmission device according to (2), wherein
the operation modes include a second operation mode,
in the second operation mode,
the first selector selects the first signal,
the second selector selects the second signal,
the first driver selectively sets the voltage of the first output terminal to one of the first voltage and the second voltage, based on the output signal of the first selector when the first control signal is at a first logic, and the first driver sets the voltage of the first output terminal to a third voltage when the first control signal is at a second logic, and
the second driver selectively sets the voltage of the second output terminal to one of the first voltage and the second voltage, based on the output signal of the second selector when the second control signal is at the first logic, and the second driver sets the voltage of the second output terminal to the third voltage when the second control signal is at the second logic.

(4) The transmission device according to (2) or (3), wherein
the operation modes include a third operation mode,
in the third operation mode,
the first selector selects the first signal,
the second selector selects the second signal,
the first driver selectively sets the voltage of the first output terminal to one of the first voltage and the second voltage, based on the output signal of the first selector, and
the second driver selectively sets the voltage of the second output terminal to one of the first voltage and the second voltage, based on the output signal of the second selector.

(5) The transmission device according to (3) or (4), further including:
a third selector configured to select one of the third signal and a fourth signal, and output the selected one of the third signal and the fourth signal;
a fourth selector configured to select one of an inversion signal of the third signal, the fourth signal, and an inversion signal of the fourth signal, and output the selected one of the inversion signal of the third signal, the fourth signal, and the inversion signal of the fourth signal;
a third driver configured to set a voltage of a third output terminal, based on an output signal of the third selector and the third control signal; and
a fourth driver configured to set a voltage of a fourth output terminal, based on an output signal of the fourth selector.

(6) The transmission device according to (5), wherein
in the first operation mode,
the third selector alternately selects the third signal and the fourth signal,
the fourth selector selects the inversion signal of the third signal when the third selector selects the third signal, and selects the inversion signal of the fourth signal when the third selector selects the fourth signal,
the third driver selectively sets the voltage of the third output terminal to one of the first voltage and the second voltage, based on the output signal of the third selector, and
the fourth driver selectively sets the voltage of the fourth output terminal to one of the first voltage and the second voltage, based on the output signal of the fourth selector.

(7) The transmission device according to (5) or (6), wherein
in the second operation mode,
the third selector selects the third signal, and
the third driver selectively sets the voltage of the third output terminal to one of the first voltage and the second voltage, based on the output signal of the third selector when the third control signal is at the first logic, and the third driver sets the voltage of the third output terminal to the third voltage when the third control signal is at the second logic.

(8) The transmission device according to any one of (5) to (7), further including:
a first serializer configured to generate the first signal;
a second serializer configured to generate the second signal;
a third serializer configured to generate the third signal; and
a fourth serializer configured to generate the fourth signal.

(9) The transmission device according to (8), wherein order of layout of the first output terminal, the second output terminal, the third output terminal, and the fourth output terminal is different from order of layout of the first serializer, the second serializer, the third serializer, and the fourth serializer.

(10) The transmission device according to (8) or (9), wherein each of the serializers uses a shift register, and is configured to change number of stages to be used in accordance with the operation modes.

(11) The transmission device according to any one of (1) to (4), further including:
a third selector configured to select one of the third signal and a fourth signal, and output the selected one of the third signal and the fourth signal;
a fourth selector configured to select one of an inversion signal of the third signal, the fourth signal, and an inversion signal of the fourth signal, and output the selected one of the inversion signal of the third signal, the fourth signal, and the inversion signal of the fourth signal;

a fifth selector configured to select one of a fifth signal and a sixth signal, and output the selected one of the fifth signal and the sixth signal;

a sixth selector configured to select one of an inversion signal of the fifth signal, the sixth signal, and an inversion signal of the sixth signal, and output the selected one of the inversion signal of the fifth signal, the sixth signal, and the inversion signal of the sixth signal;

a second control signal generator configured to generate a fourth control signal, a fifth control signal, and a sixth control signal, based on the fourth signal, the fifth signal, and the sixth signal;

a third driver configured to set a voltage of a third output terminal, based on an output signal of the third selector and the third control signal;

a fourth driver configured to set a voltage of a fourth output terminal, based on an output signal of the fourth selector and the fourth control signal;

a fifth driver configured to set a voltage of a fifth output terminal, based on an output signal of the fifth selector and the fifth control signal; and a sixth driver configured to set a voltage of a sixth output terminal, based on an output signal of the sixth selector and the sixth control signal.

(12) The transmission device according to any one of (1) to (4), further including a third driver configured to set a voltage of a third output terminal, based on the third signal and the third control signal.

(13) The transmission device according to any one of (1) to (12), wherein each of the drivers includes a plurality of driver circuits, and each of the driver circuits includes a first switch having one end and the other end, the one end being led to a first power supply, the other end being led to an output terminal of corresponding one of the drivers to which the corresponding driver circuit belongs, and the first power supply being configured to generate a voltage corresponding to the first voltage, and a second switch having one end and the other ends, the one end being led to a second power supply, the other end being led to the output terminal of the corresponding one of the drivers to which the corresponding driver circuit belongs, and the second power supply being configured to generate a voltage corresponding to the second voltage.

(14) The transmission device according to (13), wherein the first switch comprises a plurality of first switches, the second switch comprises a plurality of second switches, each of the drivers turns on one or more of the first switches included in the corresponding driver and turns off the second switches included in the corresponding driver to set the voltage of the output terminal of the corresponding driver to the first voltage, each of the drivers turns on one or more of the second switches included in the corresponding driver and turns off the first switches included in the corresponding driver to set the voltage of the output terminal of the corresponding driver to the second voltage, and each of the drivers turns on one or more of the first switches included in the corresponding driver and turns on one or more of the second switches included in corresponding driver to set the voltage of the output terminal of the corresponding driver to the third voltage.

(15) The transmission device according to (13), wherein the first switch comprises a plurality of first switches, the second switch comprises a plurality of second switches, each of the drivers turns on one or more of the first switches included in the corresponding driver and turns off the second switches included in the corresponding driver to set the voltage of the output terminal of the corresponding driver to the first voltage, each of the drivers turns on one or more of the second switches included in the corresponding driver and turns off the first switches included in the corresponding driver to set the voltage of the output terminal of the corresponding driver to the second voltage, and each of the drivers turns off the first switches and the second switches included in the corresponding driver to set the voltage of the output terminal of the corresponding driver to the third voltage through one or more termination resistors.

(16) The transmission device according to any one of (1) to (15), further including a controller configured to select one of the operation modes to control operation of the selectors and the drivers.

(17) The transmission device according to (16), wherein the controller selects one of the operation modes, based on a signal supplied from outside.

(18) A transmission device including:

a controller configured to select one of a plurality of operation modes including a first operation mode;

a first selector configured to alternately select a first signal and a second signal in the first operation mode;

a second selector configured to alternately select an inversion signal of the first signal and an inversion signal of the second signal in the first operation mode;

a first driver configured to set a voltage of a first output terminal to one of a first voltage and a second voltage, based on an output signal of the first selector in the first operation mode; and a second driver configured to set a voltage of a second output terminal to one of the first voltage and the second voltage, based on an output signal of the second selector in the first operation mode.

(19) The transmission device according to (18), further including a third driver configured to set a voltage of a third output terminal to one of the first voltage, the second voltage, and a third voltage, based on a third signal in a second operation mode, the second operation mode being included in the plurality of operation modes, wherein in the second operation mode, the first selector selects the first signal, the second selector selects the second signal, the first driver sets the voltage of the first output terminal to one of the first voltage, the second voltage, and the third voltage, based on the output signal of the first selector, and the second driver sets the voltage of the second output terminal to one of the first voltage, the second voltage, and the third voltage, based on the output signal of the second selector.

(20) The transmission device according to (19), wherein in the second operation mode, the first driver sets the voltage of the first output terminal to the third voltage, based on two or more of the first signal, the second signal, and the third signal, the second driver sets the voltage of the second output terminal to the third voltage, based on two or more of the first signal, the second signal, and the third signal, and the third driver sets the voltage of the third output terminal to the third voltage, based on two or more of the first signal, the second signal, and the third signal.

(21) The transmission device according to (19), further including:

a first serializer configured to serialize a first parallel signal to generate the first signal;

a second serializer configured to serialize a second parallel signal to generate the second signal; and a third serializer configured to serializer a third parallel signal to generate the third signal, wherein the first parallel signal, the second parallel signal, and the third parallel signal in the first operation mode are respectively different in number of bits from the first parallel signal, the second parallel signal, and the third parallel signal in the second operation mode.

(22) A communication system provided with a transmission device and a reception device, the transmission device including:

a first selector configured to select one of a first signal and a second signal, and output the selected one of the first signal and the second signal;

a second selector configured to select one of an inversion signal of the first signal, the second signal, and an inversion signal of the second signal, and output the selected one of the inversion signal of the first signal, the second signal, and the inversion signal of the second signal;

a first control signal generator configured to generate a first control signal, a second control signal, and a third control signal, based on the first signal, the second signal, and a third signal;

a first driver configured to set a voltage of a first output terminal, based on an output signal of the first selector and the first control signal; and a second driver configured to set a voltage of a second output terminal, based on an output signal of the second selector and the second control signal.

This application claims the benefit of Japanese Priority Patent Application JP 2014-062571 filed Mar. 25, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A transmission device comprising:
a transmitter including:
a controller that selects one of a plurality of operation modes including a first operation mode transmitting data by means of differential signals and a second operation mode transmitting data by means of three-phase signals and generates control signals according to the selected mode;
a plurality of output terminals, wherein the plurality of output terminals are divided into at least one group based on the selected mode, and voltages of output terminals in each group are set based on the control signals, respectively; and
wherein the controller operates so that in the first operation mode, each group includes two output terminals that are a first output terminal and a second output terminal, and
voltages of two output terminals are configured to constitute a differential signal, and
in the second operation mode, each group includes three output terminals that are the first output terminal and the second output terminal and a third output terminal, and voltages of three output terminals are configured to constitute a three-phase signal.

2. The transmission device to claim 1, wherein the transmitter further comprises
a first selector that selects one of a plurality of signals having a first signal according to control signals from the controller; and
a second selector that selects one of a plurality of signals having an inversion signal of the first signal and a second signal according to control signals from the controller.

3. The transmission device according to claim 2, wherein the controller operates so that in the first operation mode, the second selector selects the inversion signal of the first signal when the first selector selects the first signal and in the second operation mode, the second selector selects the second signal.

4. The transmission device according to claim 3, wherein the controller operates so that in second operation mode, voltages of three output terminals including a voltage of the first output terminal and a voltage of the second output terminal and a voltage of the third output terminal are set to voltage levels different from one another.

5. The transmission device according to claim 4, wherein the controller operates so that voltages of three out terminals including a voltage of the first output terminal, a voltage of the second output terminal, and a voltage of the third output terminal are set to a high-level voltage, a low-level voltage, and a medium-level voltage different from one another.

6. The transmission device according to claim 2, wherein the first selector selects and outputs one of a plurality of signals further having the second signal according to control signals from the controller.

7. The transmission device according to claim 2, wherein control signals from the controller includes a first control signal and a second control signal,
the first selector selects according to the first control signal, and
the second selector selects according to the second control signal.

8. The transmission device according to claim 7, wherein the first driver has a first driver circuit coupled to the first output terminal and a first driver controller generating to a signal input to the first driver circuit and
the second driver has a second driver circuit coupled to the second output circuit and a second driver controller generating to a signal input to the second driver circuit.

9. The transmission device according to claim 1, wherein the output terminals in the each group in the first operation mode are disposed adjacent to each other.

10. The transmission device according to claim 1, wherein the controller operates so that a voltages of three out terminals including a voltage of the first output terminal, a voltage of the second output terminal, and a voltage of the third output terminal constitute a three-phase signal.

11. The transmission device according to claim 1, wherein the transmitter further includes
a first driver setting the voltage of the first output terminal, and
a second driver setting the voltage of the second output terminal.

12. The transmission device according to claim 11, wherein
the first driver sets the voltage of the first output terminal based on a third control signal, and
the second driver sets the voltage of the second output terminal based on a fourth signal.

13. The transmission device to claim 12, further comprising:
a first selector that selects one of a plurality of signals having a first signal according to control signals from the controller; and
a second selector that selects one of a plurality of signals having an inversion signal of the first signal and a second signal according to control signals from the controller, wherein
the first driver controller generates to a signal input to the first driver circuit based on a signal output from the first selector
the second driver controller generates to a signal input to the second driver circuit based on a signal output from the second selector.

14. The transmission device according to claim 12, wherein
the first driver circuit has a first transistor, a second transistor, a first resistor and a second resistor.

15. The transmission device according to claim 14, wherein
a gate of the first transistor corresponds to the positive input terminal of the first driver circuit,
a source of the first transistor is coupled to one end of the first resistor
and
a gate of the second transistor corresponds to the negative input terminal of the first driver circuit.

16. The transmission device according to claim 1, wherein the transmitter comprises a plurality of serializers, and wherein in the first operation mode, a serializer, which is corresponding to output terminals in one group and in the plurality of serializers, output a positive signal and a negative signal to the first output terminal and the second output terminal which is adjacent to the first output terminal respectively to constitute a differential signal; and
in the second operation mode, three serializers, which are corresponding to output terminals in one group and in the plurality of serializers, output signals to the first terminal and the second terminal and the third terminal to constitute a three-phase signal.

17. The transmission device according to claim 16, wherein the transmitter comprises a plurality of selectors corresponding to the plurality of output terminals respectively, and each of the plurality of selectors selects, based on the control signals, one from output signals, which are from one or more serializers corresponding to the output terminals in one group.

18. The transmission device according to claim 17, wherein the transmitter comprises a plurality of drivers, each of the plurality of drivers
comprises:
driver controller configured to generate driving control signal based on the control signals;
a plurality of driver circuits connect to one of the plurality of output terminals, wherein the driver circuits generate a high-level voltage, a low-level voltage, or a medium-level voltage based on the driving control signal.

19. The transmission device according to claim 18, wherein in the first operation mode and the second operation mode, each of the plurality of driver circuits comprises:
a first transistor of which the gate is connected to the driver controller;
a first resistor connected to the first transistor,
a second transistor of which the gate is connected to the driver controller, and
a second resistor connected to the second transistor.

20. The transmission device according to claim 1, wherein the plurality of operation modes further comprise a third operation mode, and in the third operation mode, there is only one output terminal in each group, and the controller operates so that a voltage of the output terminal constitutes a single-phase signal.

21. The transmission device according to claim 1, output terminals, Electro-Static Discharge circuits, drivers, and serializers are stacked in this order in the transmitter.

22. The transmission device according to claim 1, output terminals, drivers, and serializers are stacked in this order in the transmitter.

23. A transmission device comprising:
a transmitter including:
a controller that selects one of a plurality of operation modes including a first operation mode transmitting data by means of differential signals and a
second operation mode transmitting date by means of three-phase signals and generates control signals according to the selected mode,
wherein the transmitter further comprises:
a first selector that selects one of a plurality of signals having a first signal according to control signals from the controller;
a first output terminal electrically connected to the first selector;
a second selector that selects one of a plurality of signals having an inversion signal of the first signal and a second signal according to control signals from the controller; and
a second output terminal electrically connected to the second selector;
wherein the controller operates so that in the first operation mode, the first selector selects the first signal and the second selector selects the inversion signal of the first signal and in the second operation mode, the second selector selects the second signal.

24. The transmission device to claim 23, wherein the controller operates so that in the first operation mode, a voltage of the first output terminal and a voltage of the second output terminal constitute a differential signal and in the second operation mode, voltages of three out terminals including a voltage of the first output terminal and a voltage of the second output terminal constitute a three-phase signal.

25. The transmission device according to claim 24, wherein
the controller operates so that in second operation mode, voltages of three out terminals including a voltage of the first output terminal and a voltage of the second output terminal are set to voltage levels different from one another.

26. The transmission device according to claim 24, wherein
the controller operates so that voltages of three out terminals including a voltage of the first output terminal and a voltage of the second output terminal are set to a high-level voltage, a low-level voltage, and a medium-level voltage different from one another.

27. The transmission device according to claim 23, wherein
the first output terminal is disposed adjacent to the second output terminal.

28. The transmission device according to claim 23, wherein
the transmitter further includes a third output terminal and the controller operates so that a voltage of the first output terminal, a voltage of the second output terminal and a voltage of the third output terminal constitute a three-phase signal.

29. The transmission device according to claim 23, wherein
the first selector selects one of the plurality of signals further having the second signal according to the control signals.

30. The transmission device according to claim 23, wherein
control signals from the controller has a first control signal and a second control signal,
the first selector selects according to the first control signal and the second selector selects according to the second control signal.

31. The transmission device according to claim 23, wherein
the transmitter further includes
a first driver setting the voltage of the first output terminal and
a second driver setting the voltage of the second output terminal.

32. The transmission device according to claim 31, wherein
the first driver has a first driver circuit coupled to the first output terminal, and
a first driver controller generating to a signal input to the first driver circuit based on a signal output from the first selector,
the second driver has a second driver circuit coupled to the second output circuit, and
a second driver controller generating to a signal input to the second driver circuit based on a signal output from the second selector.

33. The transmission device according to claim 31, wherein
the first driver sets a voltage of the first output terminal based on a third control signal, and
The second driver sets a voltage of the second output terminal based on a fourth signal.

34. The transmission device according to claim 32, wherein
The first driver circuit has a first transistor, a second transistor, a first resistor, and a second resistor.

35. The transmission device according to claim 34, wherein
a gate of the first transistor corresponds to the positive input terminal of the first driver circuit,
a source of the first transistor is coupled to one end of the first resistor and
a gate of the second transistor corresponds to the negative input terminal of the first driver circuit.

36. A transmission device comprising:
a transmitter including:
a controller that selects one of a plurality of operation modes including a first operation mode transmitting data by means of differential signals and a second operation mode transmitting date by means of three-phase signals and generates control signals according to the selected mode,
wherein the transmitter further includes
a plurality of output terminals, wherein the plurality of output terminals are divided into at least one group based on the selected mode, and voltages of output terminals in each group are set based on the control signals, respectively.

37. A transmission device comprising:
a transmitter including:
a controller that selects one of a plurality of operation modes including a first operation mode transmitting data by means of differential signals and a second operation mode transmitting date by means of three-phase signals and generates control signals according to the selected mode, wherein the transmitter comprises a plurality of serializers, and wherein
in the first operation mode, a serializer, which is corresponding to output terminals in one group and in the plurality of serializers, output a positive signal and a negative signal to the first output terminal and the second output terminal which is adjacent to the first output terminal respectively to constitute a differential signal; and
in the second operation mode, three serializers, which are corresponding to output terminals in one group and in the plurality of serializers, output signals to the first terminal and the second terminal and the third terminal to constitute a three-phase signal.

38. The transmission device according to claim 37, wherein the transmitter comprises a plurality of selectors corresponding to the plurality of output terminals respectively, and each of the plurality of selectors selects, based on the control signals, one from output signals, which are from one or more serializers corresponding to the output terminals in one group.

39. The transmission device according to claim 38, wherein the transmitter comprises a plurality of drivers, each of the plurality of drivers comprises:
driver controller configured to generate driving control signal based on the control signals;
a plurality of driver circuits connect to one of the plurality of output terminals, wherein the driver circuits generate a high-level voltage, a low-level voltage, or a medium-level voltage based on the driving control signal.

40. The transmission device according to claim 39, wherein in the first operation mode and the second operation mode, each of the plurality of driver circuits comprises:
a first transistor of which the gate is connected to the driver controller;
a first resistor connected to the first transistor,
a second transistor of which the gate is connected to the driver controller, and
a second resistor connected to the second transistor.

41. The transmission device according to claim 23, wherein the transmitter further includes
a plurality of output terminals that are divided into at least one group based on the selected mode, wherein the plurality of operation modes further comprise a third operation mode, and in the third operation mode, there is only one output terminal in each group of the plurality of output terminals, and the controller operates so that a voltage of the only one output terminal constitutes a single-phase signal.

42. The transmission device according to claim 23, wherein output terminals, Electro-Static Discharge circuits, drivers, and serializers are stacked in this order in the transmitter.

43. The transmission device according to claim 23, wherein output terminals, drivers, and serializers are stacked in this order in the transmitter.

* * * * *